United States Patent [19]

Ghaffari

[11] Patent Number: 4,979,095
[45] Date of Patent: Dec. 18, 1990

[54] APPARATUS AND METHOD FOR A DATA PROCESSING SYSTEM INTERFACE HAVING MULTIPLE BIT PROTOCOL SIGNALS

[75] Inventor: Mehrdad Ghaffari, Kent, Wash.
[73] Assignee: Boeing Company
[21] Appl. No.: 499,215
[22] Filed: May 31, 1983
[51] Int. Cl.[5] ............................................. G06F 15/16
[52] U.S. Cl. ............................ 364/200; 222.2/240.6; 222.2/229; 455/607
[58] Field of Search .............. 455/606, 608, 612, 607; 364/200 MS File, 900 MS File

[56] References Cited

U.S. PATENT DOCUMENTS

| 4,161,650 | 7/1979 | Caouette et al. | 250/199 |
| 4,161,651 | 7/1979 | Sano et al. | 250/199 |
| 4,166,946 | 9/1979 | Chown et al. | 250/199 |
| 4,227,075 | 10/1980 | Holland | 370/4 |
| 4,249,266 | 2/1981 | Nakamari | 455/608 |
| 4,257,125 | 3/1981 | Theall, Jr. | 455/608 |
| 4,276,656 | 6/1981 | Petryk, Jr. | 455/608 |
| 4,388,732 | 6/1983 | Hansel | 455/608 |
| 4,399,563 | 8/1983 | Greenberg | 455/612 |
| 4,446,515 | 5/1984 | Sauer et al. | 455/612 |
| 4,453,229 | 6/1984 | Schaire | 364/900 |

Primary Examiner—Lawrence E. Anerson

[57] ABSTRACT

An interface for a data processing system wherein data processing units communicate via a multiple line data channel and a control channel. The interface transmitter converts control signals from the data processor into mulitple bit protocol words, whereas data signals are split into multiple byte portions. The protocol words and data byte portions are then transmitted serially over a single line, such as a fiber optic cable or an RF link. The interface receiver section serial-to-parallel converts the incoming bit stream to restore the protocol and data signals. Appropriate control signals are issued to the associated data processing unit in response to received protocol signals, and data signals are parallel loaded to the unit. The use of an interface at each data processing unit accommodates full duplex operation between the units via a minimum number of connecting links, e.g., two links for fiber optic systems, one link for an RF system.

11 Claims, 34 Drawing Sheets

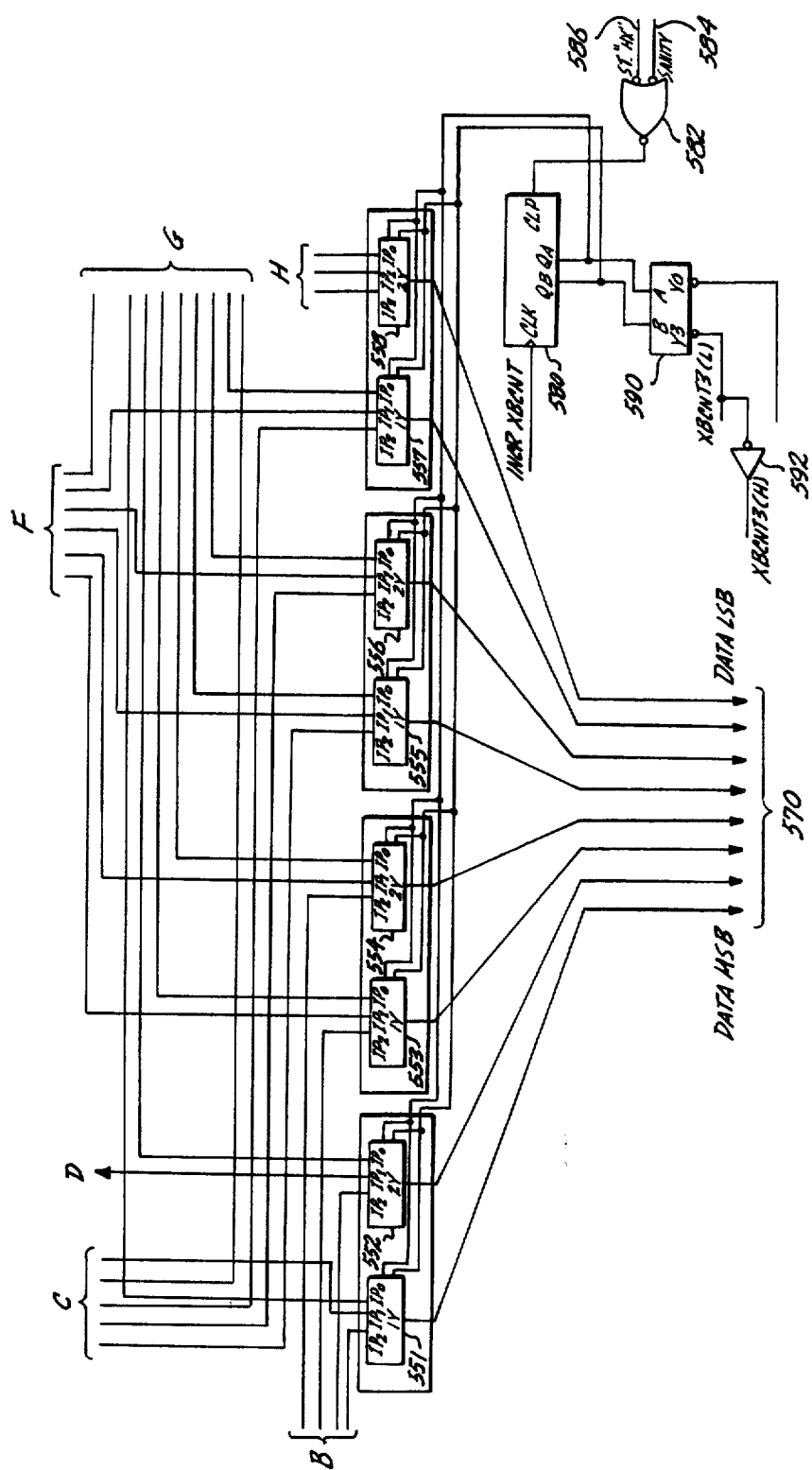

APPARATUS AND METHOD FOR A DATA PROCESSING SYSTEM INTERFACE HAVING MULTIPLE BIT PROTOCOL SIGNALS

BACKGROUND OF THE INVENTION

The present invention pertains to the data processing art and, more particularly, to an interface for providing communication between data processors using a minimum number of connecting lines.

In large data processing systems it is often necessary to separate data processing units by considerable distances. For example, in one computer aided design system involving real-time interactive computer graphic tools to create and design components, a plurality of satellite, or work stations, including a graphic screen, a keyboard, an alphanumeric menu display, and other support hardware and peripheral equipment all feed into a graphic central processing unit which, in turn, connects to a data management system. The data management system is in charge of file management and other functions.

The graphic central processing units and the data management system require a controlled environment (e.g., temperature, humidity, etc.), whereas the satellite work stations may be used in an office environment. Thus, the graphic central processing units and the data management system are isolated in controlled rooms, whereas the work stations are scattered throughout design areas. The distances between the controlled area and the work station locations may exceed 1,500 feet.

The problem created by such large separation distances results from the fact that the data processing units normally communicate over parallel data and control lines. For example, in the above-described computer aided design system, communication between a work station and a graphic central processing unit is accomplished over 64 data lines (32 lines in each direction), eight control lines (4 in each direction), and two ground and shield signals, resulting in a total of 74 lines bundled in one multiconductor cable. This results in a large interconnecting cable diameter having a large bend radius. Such cables are thick, stiff and hard to pull and result in excessive installation requirements.

While numerous communication interface devices, which devices reduce the number of interconnecting cables, are known to the prior art, none of these previous designs are capable of the high speed transfer of both data and control signals over single lines.

SUMMARY OF THE INVENTION

It is an object of this invention, therefore, to provide a communication interface for use in a data processing system wherein high speed data and control signal communication is accomplished using a minimum of interconnecting communication links.

Briefly, according to the invention, a communication interface is provided in a data processing system wherein data processing units communicate via a multiple line data channel and a control channel. The communication interface connects to each data processor such that data and control signals are carried over links between the interfaces associated with each data processing unit. The communication interface comprises a transmitter section which includes a transmit data controller processor (TXDC/P) and a transmit data communication controller (TXCC). The TXDC/P includes multiple data inputs, each data input being adapted to be coupled to one of the data processoor output data lines. A control input is adapted to be coupled to the data processor control line. A multiple bit protocol signal is produced corresponding to a received one of the data processing unit control line signals. A controller responds to data processing control and data signals, and a received TXHRE signal, for predeterminedly loading protocol signals and data signals onto a provided output bus, and issuing a load transmit signal (LDXMIT) upon loading the output bus.

The TXCC has an input register with multiple inputs coupled to the TXDC/P output bus. An output means is adapted for coupling a signal to the link between communication interfaces. A controller responds to a LDXMIT signal to load the signal on the TXDC/P output bus into the TXCC input register, the controller serially outputting the TXCC input register signal and coupling this serial signal to the output means, thereafter issuing a TXHRE signal to the TXDC/P.

The receiver section includes a receive data communication controller (RXCC) and a receive data controller processor (RXDC/P). The RXCC includes an input processing means for predeterminedly processing a signal on the link from another communication interface. A controller sequentially loads a link carried signal into a provided RXCC register and issues a control signal BRCVD in response to so loading the RXCC register.

The RXDC/P includes a register having an input bus coupled to the output of the RXCC register, and multiple outputs, each output adapted to be coupled to the data processor received data and control lines. A controller responds to a BRCVD signal to parallel load the data in the RXCC register onto the RXDC/P register. The controller also identifies a protocol signal and issues an appropriate control signal on the data processor unit input control channel in response thereto and, further, outputs the RXDC/P register data signal for transmission to the data processing unit.

In a data processing system wherein data processors exchange multiple bit, parallel data words over a multiple line data channel and wherein each processor produces each data word in association with a DATA READY control signal on a control channel, each processor acknowledging receipt of data by the transmission of an ACK signal on the control channel, a method for processing input and output signals at each data processor comprises the steps of:

(A) providing a transmit data controller processor (TXDC/P), the TXDC/P performing the steps of:
  (i) providing a TXDC/P output bus,
  (ii) monitoring the data and control channels,
  (iii) identifying the condition of a DATA READY signal on the control channel and in response thereto;
    (a) generating a corresponding multiple bit protocol word and,
    (b) sequentially loading onto the TXDC/P output bus the protocol word and predetermined portions of the data words supplied on the data channel, in response to successive received TXHRE signals;
  (iv) identifying the condition of an ACK signal on the control channel and in response thereto:
    (a) generating a corresponding multiple bit protocol signal, and (b) loading the protocol signal onto the TXDC/P output bus;
(B) providing a transmit data communication controller (TXCC/P), the TXCC/P performing the steps of:
  (i) providing an output processing means for predeterminedly processing a serial signal and coupling said processed serial signal to an output line, the output line being coupled to another processor,
  (ii) parallel-to-serial converting each signal on the TXDC/P output bus,
  (iii) coupling each such serial signal to said output processing means, and
  (iv) issuing a TXHRE signal to the TXDC/P;
(C) providing a receive data communication controller (RXCC) for performing the steps of:
  (i) receiving and predeterminedly processing a serial signal transmitted by the TXCC of another data processor, and
  (ii) serial-to-parallel converting said processed serial signal into the protocol and data signal; and
(D) providing a receive data controller processor (RXDC/P) for performing the steps of:
  (i) receiving the serial-to-parallel converted protocol and data signals from the TXCC,
  (ii) identifying a protocol signal corresponding to the DATA READY signal and, in response thereto:
    (a) issuing a DATA READY signal to the control channel of an associated data processor, and
    (b) combining successive portions of a data word to restore said word and apply said restored word to the data channel input of an associated data processor, and
  (iii) identifying a protocol signal corresponding to an ACK and in response thereto issuing an ACK signal to the control channel of an associated data processor.

BRIEF DESCRIPTION OF THE DRAWINGS

FIGS. 7A-D are detailed schematic diagrams illustrating the preferred construction of the transmit data controller processor;

FIGS. 9A-D are detailed schematic diagrams of the transmit communication controller for use with an RF modem;

DETAILED DESCRIPTION OF THE PREFERRED EMBODIMENTS

Figure 1:
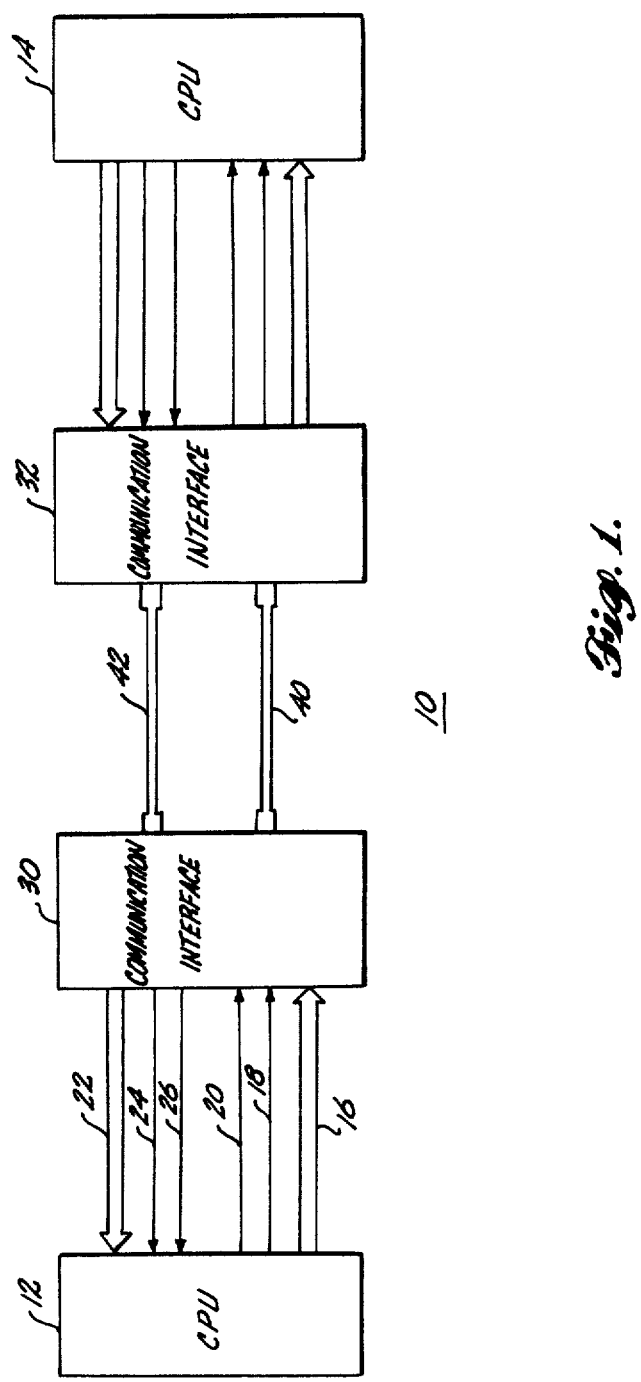
FIG. 1 is a block diagram illustrating the principle components of a data processing system including a pair of central processing units, associated communication interfaces, and interconnecting links.

FIG. 1 is a block diagram illustrating a data processing system, indicated generally at 10. Here, data is processed at each of two central processing units (CPU's) 12, 14. The CPU's communicate with one another via data and control channels. Thus, with reference to CPU 12, data is output on a multiple line data channel 16. Control signals are output on control lines 18, 20. Data is input to CPU 12 on a multiple line data channel 22, with lines 24 and 26 being input control lines. CPU 14, it will be understood, has a similar configuration of input and output control data channels.

In a specific embodiment of the invention, the data processing system forms part of a computer aided design network. CPU 12, thus, corresponds to a standard interactive design system whereas CPU 14 corresponds to any one of several satellite work stations, or a data management host CPU. In this system, the data channels 16, 22 comprise 32 lines in each direction, with the 32 lines carrying 16-bits. The control lines 18, 20, 24 and 26 are actually comprised of 8 lines, carrying a total of four signals. Adding to this two ground and shield lines, the total number of conductors required in a cable connecting CPU 12 to CPU 14 amounted to 74 lines. This, quite clearly, was a cumbersome wire bundle, particularly in view of the fact that the work station CPU 14 might be placed over 1,500 feet from the interactive design system CPU 12.

The present invention provides a solution to the problem of running long multiple connector wire bundles through the use of communication interfaces 30, 32 associated with CPU's 12, 14, respectively. Each communication interface, such as interface 30, converts input data signals, as provided over data channel 16, and control signals, as provided over control channels 18, 20, to a form which is suitable for transmission over a single link, such as link 40. In addition, signals passed over a link, such as link 42 from another communication interface are restored to their original form and output to an associated CPU, such as CPU 12, over the appropriate data channel 22 and control channels 24, 26.

The links 40, 42 may be comprised of any interconnecting means capable of handling serial data and, in preferred embodiments of the invention, may be comprised of either a fiber optic cable or a radio frequency carrying cable.

Figure 2:
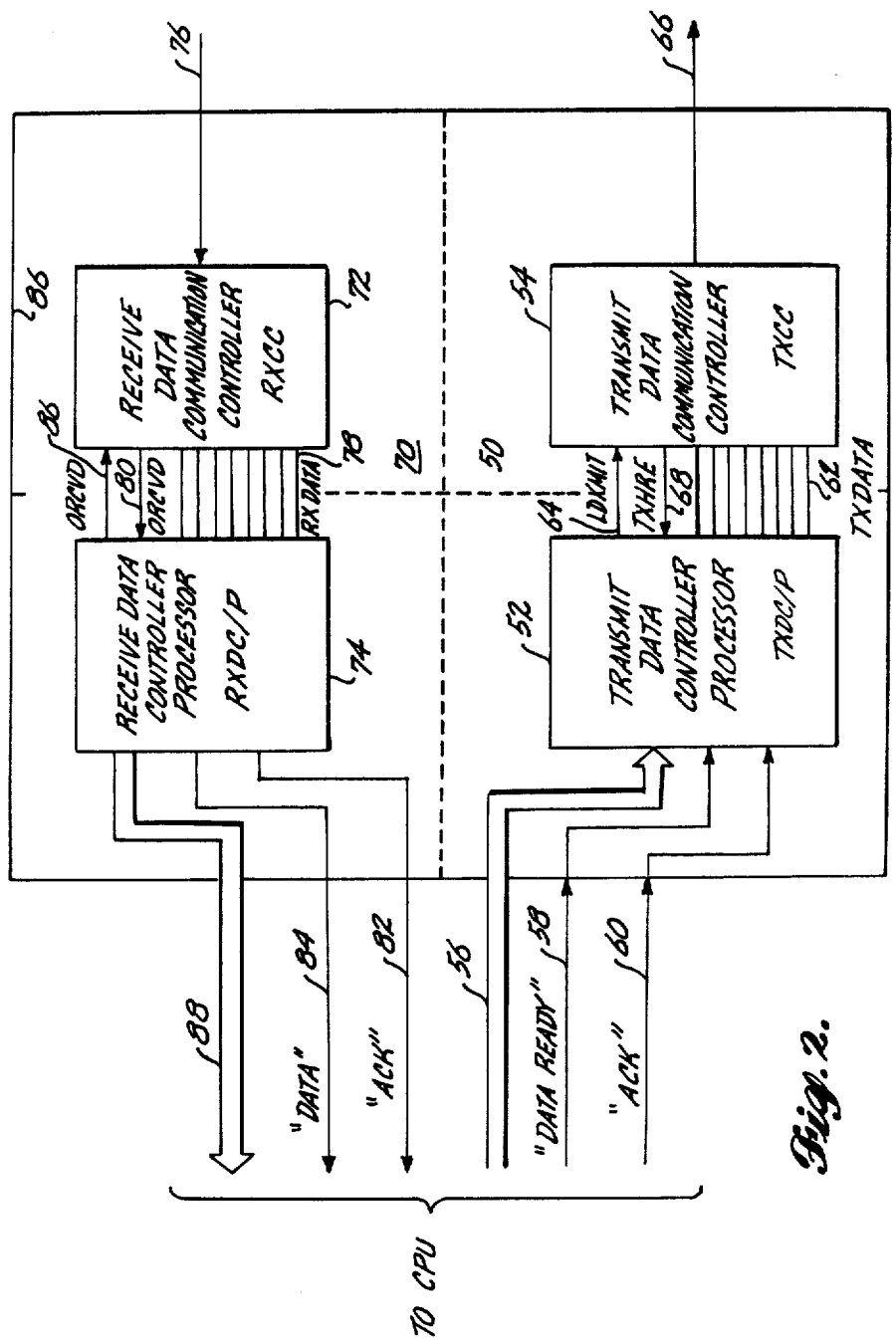
FIG. 2 is a block diagram illustrating the principle components of the communication interface.

FIG. 2 is a block diagram illustrating the principle components of a communication interface. The interface is comprised of a transmit portion, indicated generally at 50 and a receive portion, indicated generally at 70.

The transmit portion includes a transmit data controller processor (TXDC/P) 52 and a transmit data communication controller (TXCC) 54. Data from the associated CPU is input to the TXDC/P over a 16-bit data channel 56. When data is to be transmitted, the CPU also activates a "DATA READY" control line 58. If, however, the associated CPU is acknowledging having received data from another CPU, it activates an ACK control line 60.

When the TXDC/P receives a DATA READY control signal over line 58, it proceeds to latch in the 16-bit data signal on data channel 56. The TXDC/P issues an 8-bit protocol signal representative of a data-to-follow condition, on an 8-bit output bus 62. Also, a control signal (LDXMIT) is passed to the TXCC 54 over a control line 64. The TXCC responds to the input protocol signal by outputting the signal in serial form and Manchester encoding the information before routing the protocol signal over an output link 66. Once the protocol signal has been processed through the hold register in the TXCC 54, a TXHRE signal is issued from the TXCC 54 to the TXDC/P 52 over a control line 68, thereby indicating that its hold register is empty and is capable of processing additional information. In response to receiving the TXHRE signal, the TXDC/P 52 next loads the lower 8-bits of the input data word onto the output bus 62, and issues a LDXMIT signal on control line 64. The lower 8-bit signal is loaded into the hold register of TXCC 54, where, as with the protocol signal, it is serially read out, processed through a Manchester encoder, and then output on the link 66. Again, the TXCC 54 issues a TXHRE signal to TXDC/P 52 which, in response thereto, loads the upper 8-bits of the 16-bit data word onto the output bus 62. At this point, the TXDC/P returns to an idle state awaiting a further command from the CPU. The TXCC 54, as before, serially outputs the 8-bit signal, processing the signal through a Manchester encoder before applying it to the output link 66.

If the TXDC/P 52 receives an ACK control signal over control line 60, it responds by generating a corresponding 8-bit protocol signal. This protocol signal is loaded onto the output bus 62 for transmission by TXCC 54 to the output link 66 as described above. The TXDC/P 52 returns to its idle state after issuing the appropriate protocol signal. For applications wherein the output link 66 is comprised of a fiber optic cable, the TXCC 54 includes an electro-optical transducer which converts the electrical signal to an intensity modulated optical carrier suitable for application to the fiber optic cable.

The receive section 70 of the communication interface includes a receive data communication controller (RXCC) 72 and a receive data controller processor (RXDC/P) 74. The RXCC 72 receives serial information over a link 76 from another communication interface. If the received data is Manchester encoded, the RXCC 72 recovers the transmit clock, data and sync signals. A recovered 8-bit byte of data is converted into a parallel format and loaded into a buffer connected to an 8-bit output bus 78. Once the buffer is fully loaded, the RXCC 72 issues a byte received (BRCVD) signal to the RXDC/P 74 over a line 80. Inasmuch as the first 8-bits constitutes the restored protocol signal, the RXDC/P determines whether the protocol signal represents to-be-received data, or whether it is an acknowledge signal. If the signal is merely an acknowledge signal, the RXDC/P 74 issues an appropriate ACK signal to the associated CPU on the control line 82. If, however, the protocol signal indicates that data is to follow, the RXDC/P 74 issues an appropriate DATA signal to the CPU on control line 84. The RXDC/P 74 acknowledges receipt of the 8-bit byte by sending a BRCVD signal to RXCC 72 over a control line 86. In response to a protocol signal indicating that data is to follow, the RXCC 72 loads its register with the following 8-bits which are coupled over bus 78 to the RXDC/P 74 along with a BRCVD signal on control line 80. Since the format at the transmitter end was to follow a DATA READY signal with the lower 8-bits of a data word, the RXDC/P 74 responds to this received byte by loading it into the lower 8-bits of a 16-bit register. The RXCD/P 74 acknowledges having received the bit over line 86 and, subsequently, receives the upper 8-bits of the data word from the RXCC 72 over line 78 which it loads into the upper 8-bits of its register. Now, the restored 16-bit data word may be output over data channel 88 to the associated CPU. At this point, both the RXDC/P 74 and RXCC 72 return to the idle state, awaiting a subsequent input on link 76.

In this way, control and data signals may be efficiently transferred from one data processing unit to another, in full duplex, using only two links.

Figure 3:
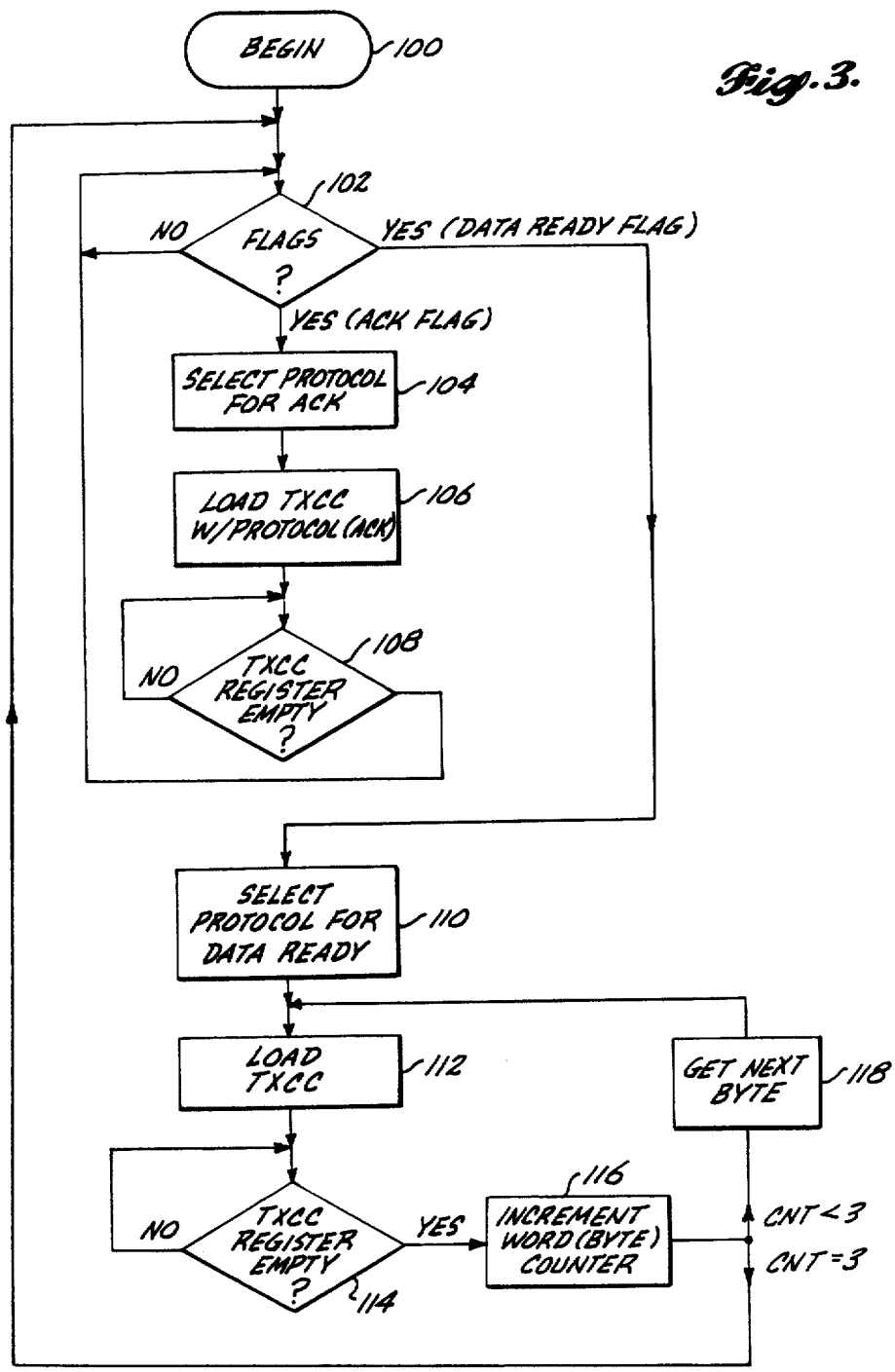
FIG. 3 is a logic flow diagram illustrating the procedural steps executed by the preferred transmit data controller processor, as shown in FIG. 2.

FIG. 3 is a logic flow diagram illustrating the logic steps executed by the TXDC/P of FIG. 2. After initialization and start-up "sanity" checks, herein labeled BEGIN at 100, the TXDC/P determines, at block 102, whether or not it is receiving an input control signal, or flag, from the associated CPU. If no flags are received, the TXDC/P loops back continuously looking for a flag signals.

If an acknowledge ACK flag is received, the TXDC/P responds by selecting an 8-bit protocol corresponding to ACK at block 104. This protocol signal is then loaded to the TXCC at block 106. If the TXCC register is not empty, as monitored at 108, the TXDC/P continues to apply the protocol signal until the signal is actually loaded into the TXCC. Once the protocol signal is loaded, the TXDC/P returns to the condition of looking for an input flag at 102.

If a DATA READY flag is received, the TXDC/P responds at block 110 by selecting the protocol signal corresponding to DATA READY. This protocol signal is loaded to the TXCC at block 112. As with block 108, the protocol signal is applied to the TXCC until the TXCC register is empty, at block 114.

Once the protocol signal corresponding to DATA READY has been loaded into the TXCC, the TXDC/P prepares to divide the 16-bit data signal from the CPU which accompanies a DATA READY into two 8-bit bytes. Thus, at block 116 the TXDC/P increments a counter by one. If the count is now less than three, which it would be for having just transmitted one protocol byte, the next 8-bit byte, corresponding to the lower 8-bits of a 16-bit data signal is collected at block 118. This byte is then loaded to the TXCC at 112 and 114 and the counter, at 116, is incremented now to a count of two. Since the count is still less than three, the next 8-bit byte, corresponding to the upper 8-bits of the data signal are collected at block 118 and this byte, as before, is loaded to the TXCC via blocks 112, 114. With a subsequent incrementing of the counter at 116, the count now equals three whereby the TXDC/P returns to its idle state of looking for flags at 102.

Figure 4:
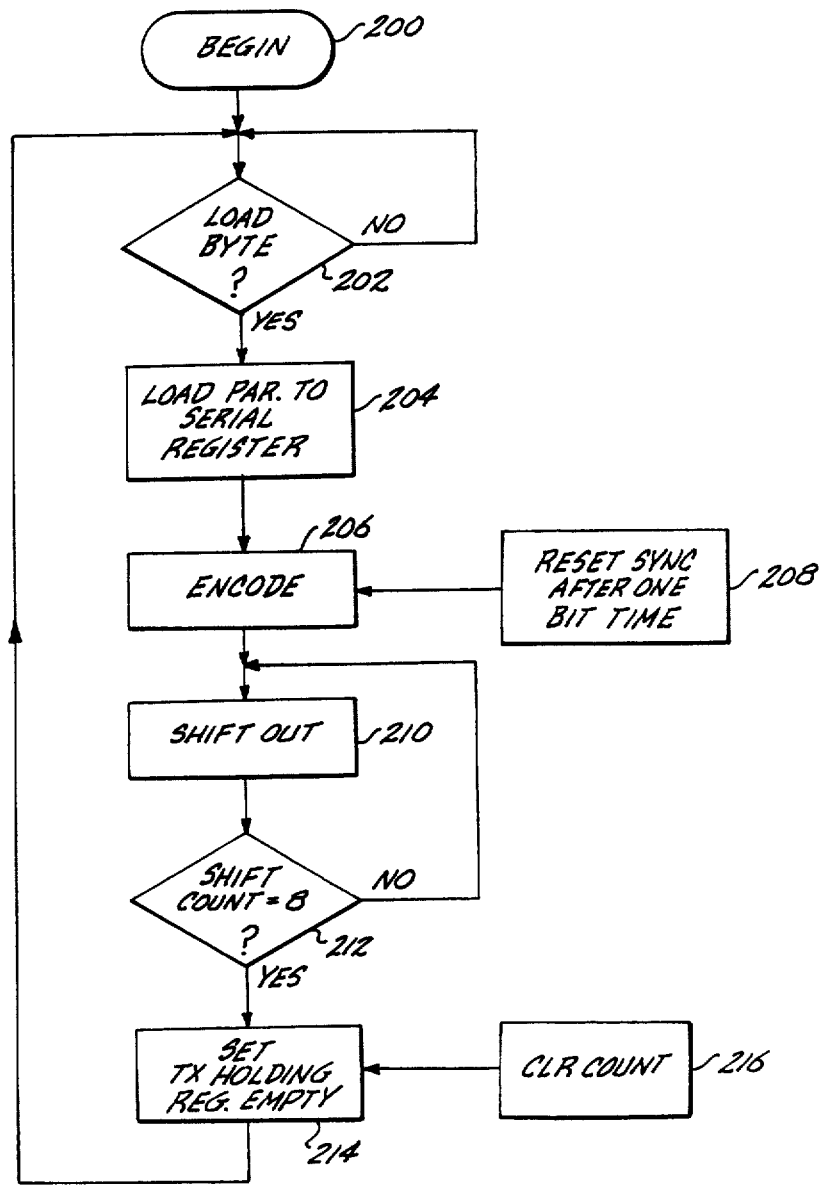
FIG. 4 is a logic flow diagram illustrating the procedural steps executed by the preferred transmit data communication controller, as shown in FIG. 2.

FIG. 4 is a logic flow diagram illustrating the steps executed by the TXCC of FIG. 2.

After initialization and start-up "sanity" checks, at BEGIN 200, the TXCC determines at block 202 whether or not an 8-bit byte is being loaded out of the TXDC/P. If not, the TXCC loops back and awaits such a byte. If a byte is being loaded from the TXDC/P, this byte is loaded into a parallel-to-serial register at 204. The resulting serial bit stream is encoded at 206. In this, the preferred embodiment of the invention, a Manchester encoder is employed. As part of the Manchester encoder, a sync signal is issued. The beginning of a transmission is identified by the deletion of one clock transition from the Manchester encoder at block 208. The TXCC then proceeds to shift out, at block 210, the encoded serial bit stream one bit at a time. This procedure continues until, at block 212, a total of 8-bits (i.e., the full byte) has been shifted out. At this point, all of the data bits within the TXCC holding register have been processed, such that the TXCC indicates a holding register empty condition at 214. Also, the shift count is cleared at 216. The TXCC then returns to its idle state of looking for a load byte condition from the TXDC/P at 202.

Figure 5:
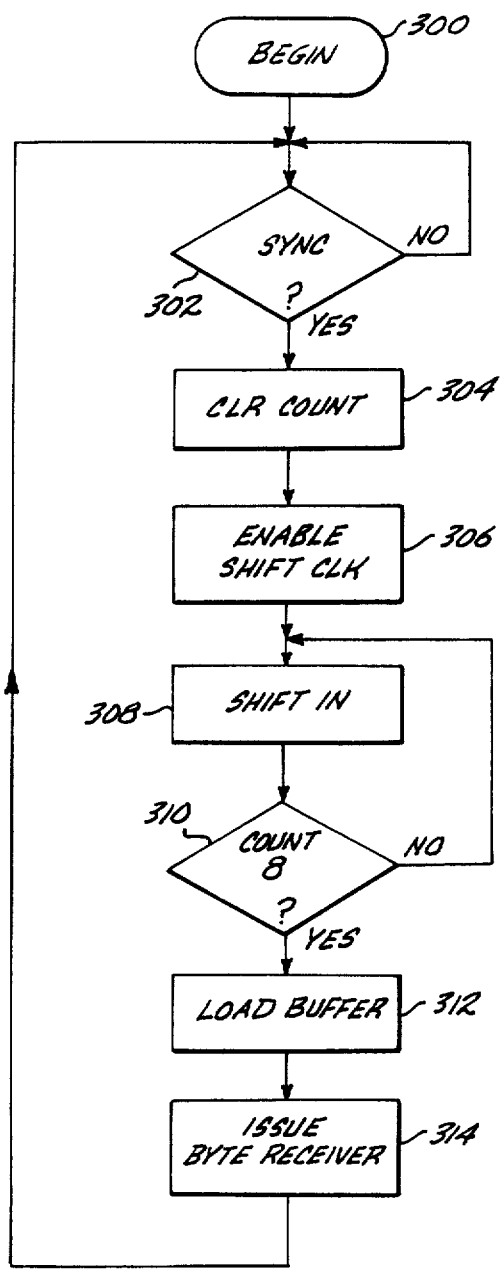
FIG. 5 is a logic flow diagram illustrating the procedural steps executed by the preferred receive data communication controller, as shown in FIG. 2.

FIG. 5 is a logic flow diagram executed by the RXCC of FIG. 2.

After an initialization and start-up "sanity" check at BEGIN 300, the RXCC determines whether or not it has received a sync signal at 302. If no sync signal has been received, the RXCC loops back awaiting such a signal. If a sync signal has been received, a count is cleared to zero in a counter at 304. The recovered clock signal is enabled at 306 and the serial data is sequentially shifted in, at 308, to a register. This process continues at 310 until 8-bits have been counted in to the register, indicating one full received byte. This byte of information is then parallel loaded into a load buffer at 312 and a byte received signal is issued to the RXDC/P at 314. Thereafter, the RXCC returns to its idle state looking for an input sync signal.

Figure 6:
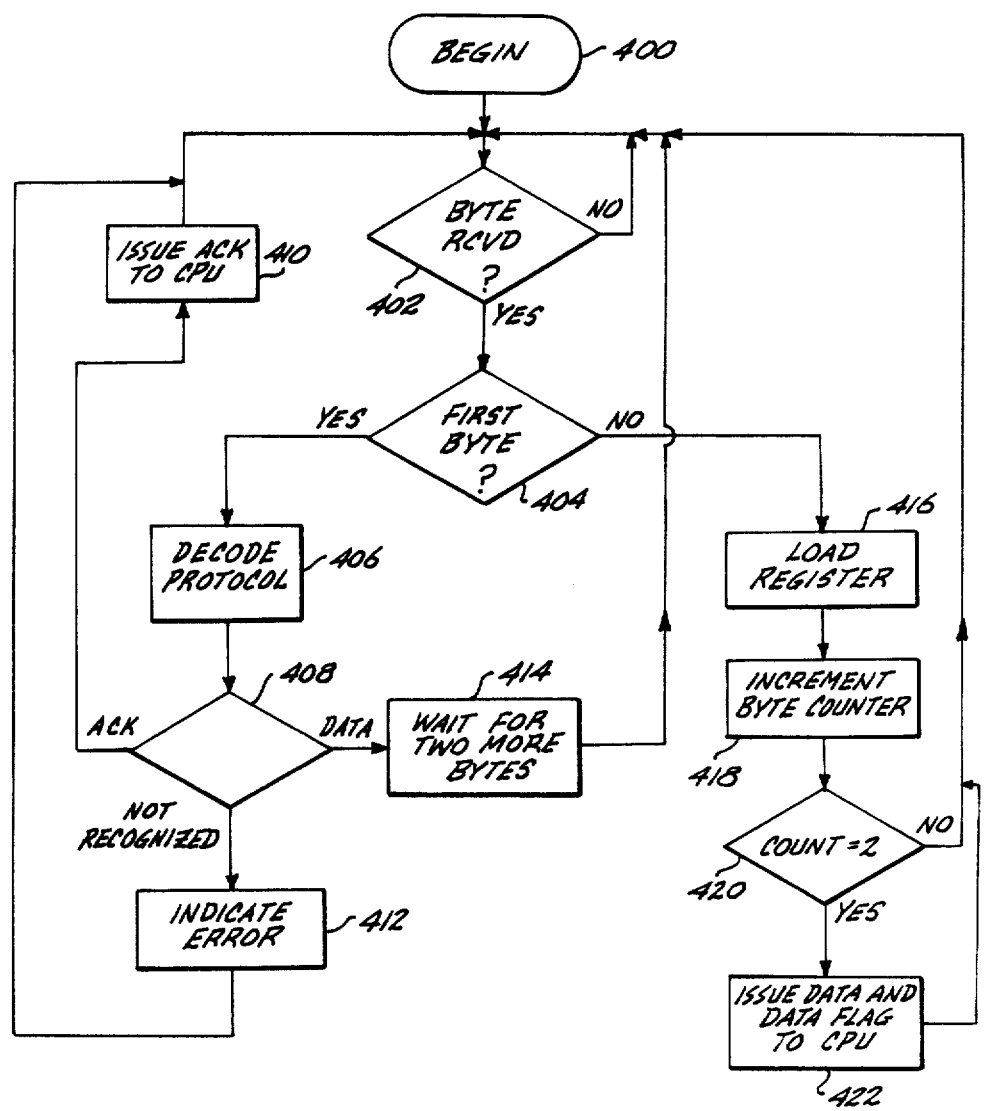
FIG. 6 is a logic flow diagram illustrating the procedural steps executed by the preferred receive data controller processor, as shown in FIG. 2.
Figure 7A:
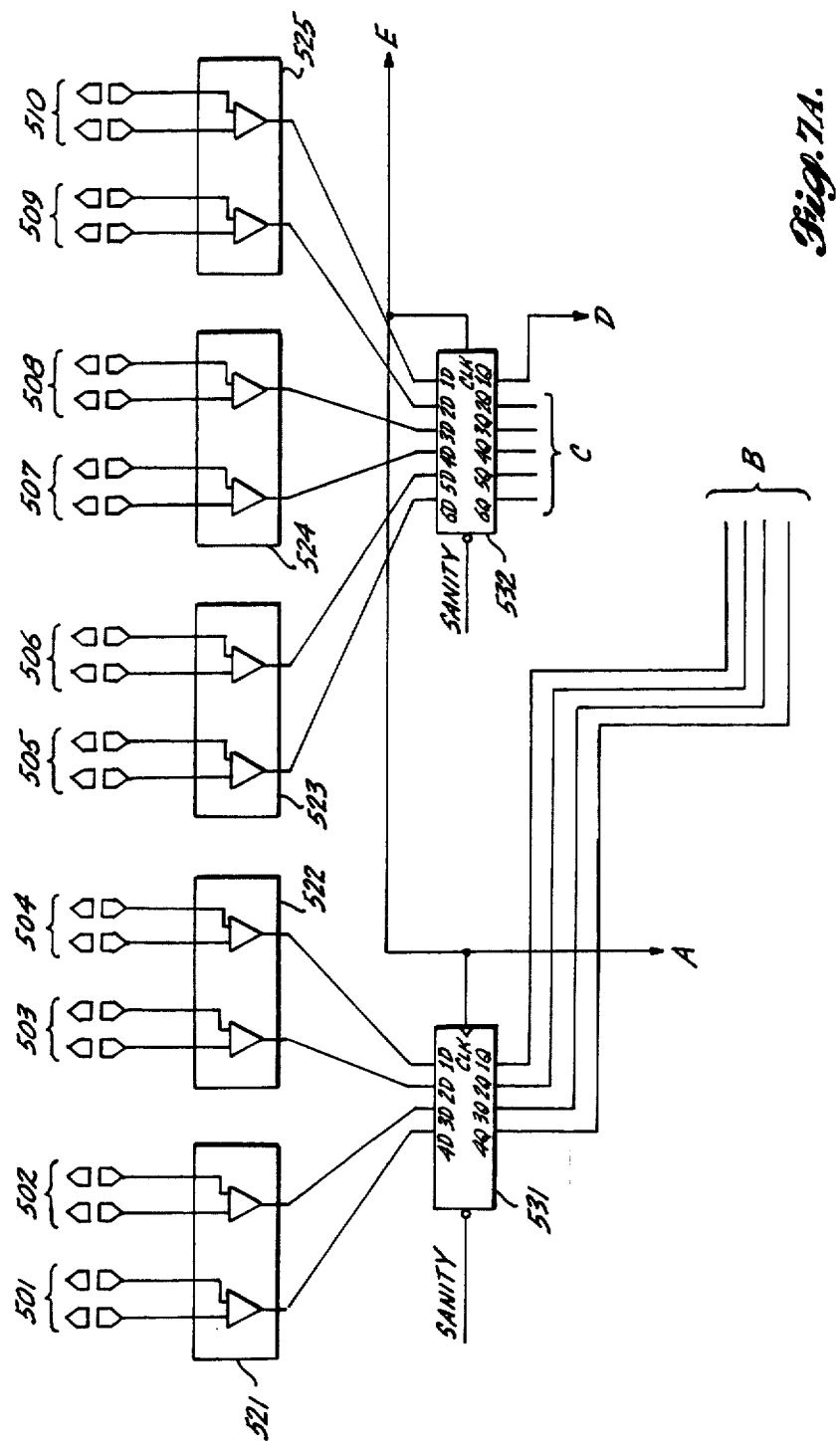
Figure 7B:
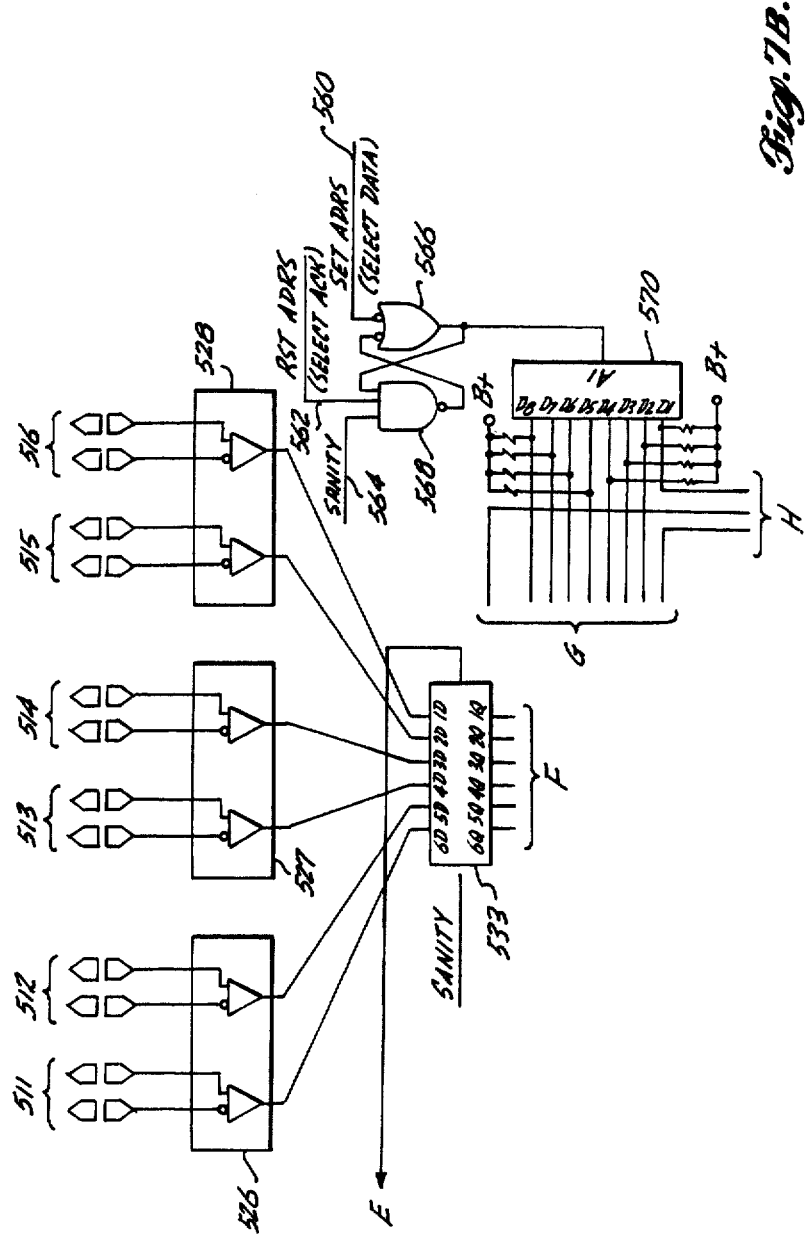
Figure 7D:
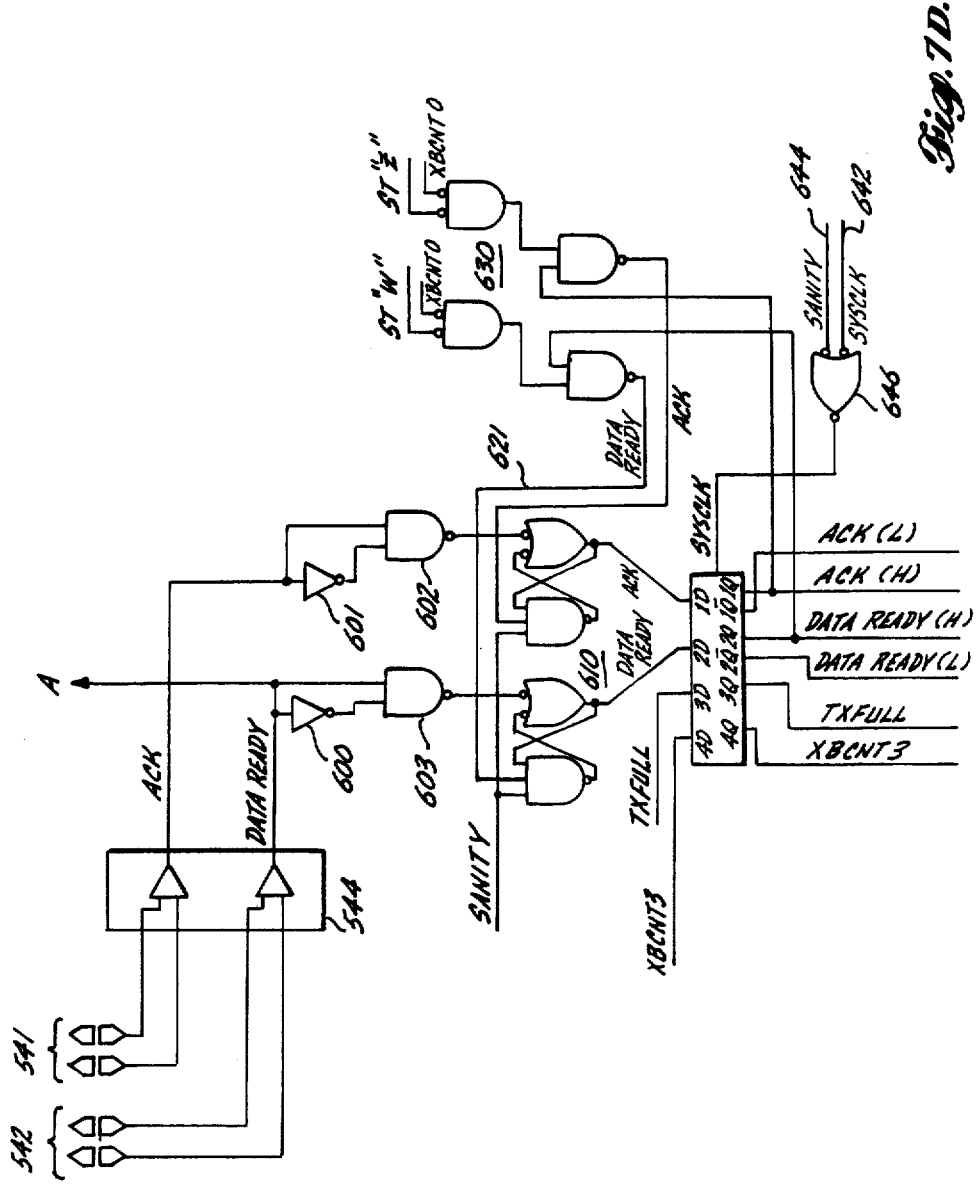
Figure 6A:
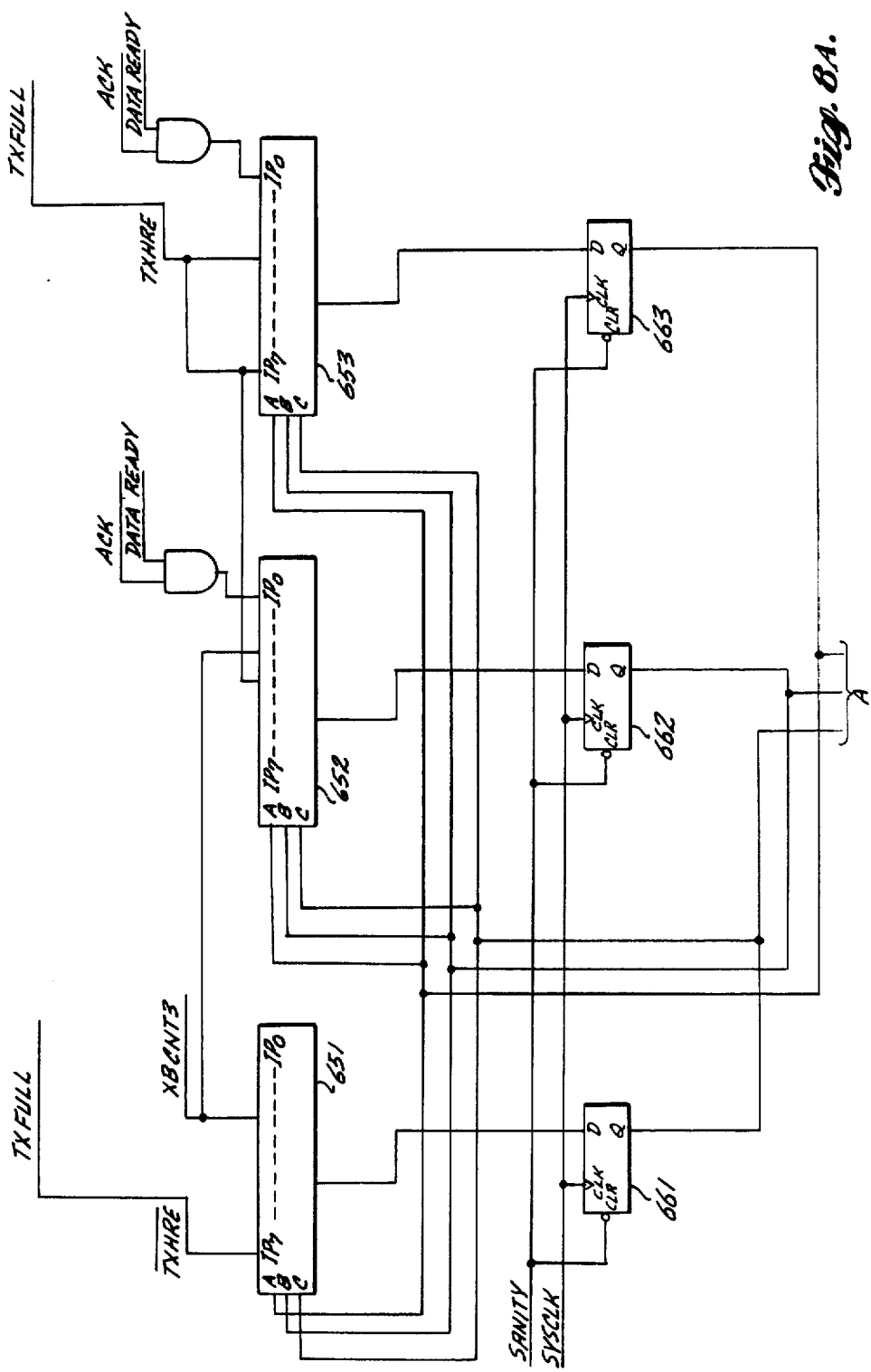

FIG. 6 is a logic flow diagram illustrating the steps executed by the RXDC/P of FIG. 2.

After initialization and start-up "sanity" checks at BEGIN 400, the RXDC/P determines whether or not it is receiving a byte received signal at 402 from the RXCC. If no such signal is received, the RXDC/P loops back, continuously looking for such a signal.

If a byte received signal is present, the RXDC/P, at 404, determines whether or not this is the first byte received. If it is the first byte, then it must be protocol information, and the protocol is decoded at 406. At 408, if the protocol signal corresponds to the ACK control signal, the appropriate ACK signal is issued, at 410, to the CPU, with the system thereafter returning to the idle state of looking for a received byte at 402. Further, if the protocol signal is not recognized as an allowed signal, an error is indicated at 412 and the system returns to its idle state.

If, however, the protocol signal is decoded as that signal corresponding to data to be received, the system knows that it will then receive two bytes of data. Thus, at 414 the system returns to the byte received block 402. Now, a subsequent received byte, since it is not the first byte at 404, is loaded into a register at 416. A byte counter is thereafter incremented by one at 418. A test is made at 420 to determine whether the count of the byte counter has incremented to two. In this case, it has not and, as such, the system reverts to receive the next byte at 402. The next byte, corresponding to the upper 8-bits of the data word, is now loaded into the register at 416, with the byte counter being incremented by one again at 418. At this point, the count of the byte counter has incremented to two whereby the system knows that the 16-bit data signal has been restored. Thus, at 422 the 16-bit data signal and a data flag are issued, in parallel, to the associated CPU.

FIGS. 7A-D are detailed schematic diagrams illustrating the preferred construction of the transmitter data controller/processor. The 16-bit data channel signal from an associated central processing unit is received in differential form over 16 wire pairs 501-516. The differential signals are converted to single ended signals via differential line receivers 521-528, here, preferably comprised of type 75182 integrated circuits.

The outputs from the differential line receivers 521-528 feed to the inputs of latches 531-533 (preferably type 74S174 integrated circuits).

The ACK control signal and the DATA READY signal are coupled, differentially, from the central processing unit over wire pairs 541, 542, respectively. These signals are also converted to single ended form via differential line receiver 544.

A received DATA READY signal is fed to the clock input of the latches 531-533, thereby causing each of the data bit signals to be clocked to the outputs of these latches.

Each data signal from the latches 531-533 is fed to an input of one of eight 4-to-1 multiplexers 551-558.

Also fed to inputs of the 4-to-1 multiplexers 551-558 is an appropriate 8-bit protocol signal. The controller for the TXDC/P (FIGS. 8A and B) activates a line 560 in the event that a received control signal from the CPU over wire pair 542 indicates a DATA READY condition, whereas a line 562 is activated in the event that an ACK signal over wire pair 541 from the CPU is received. These signals, along with a sanity signal on a line 564 from the CPU is received. These signals, along with a sanity signal on a line 564 are fed to a set/reset flip flop comprised of gates 566 and 568. The output from this flip flop is fed to the A1 address input of a programmable read only memory (PROM) 570 (here, preferably a 74S188 integrated circuit). The PROM 570 is programmed to output a unique 8-bit protocol signal for each of the ACK and DATA READY conditions. This protocol signal, as mentioned above, is applied to the inputs of the multiplexers 551-558.

In the configuration shown, the multiplexers 551-558, by suitable addressing at their address inputs, are capable of outputting either the lower 8-bits of the 16-bit data channel, the upper 8-bits of the 16-bit data channel or the 8-bit protocol signal.

Figure 8B:
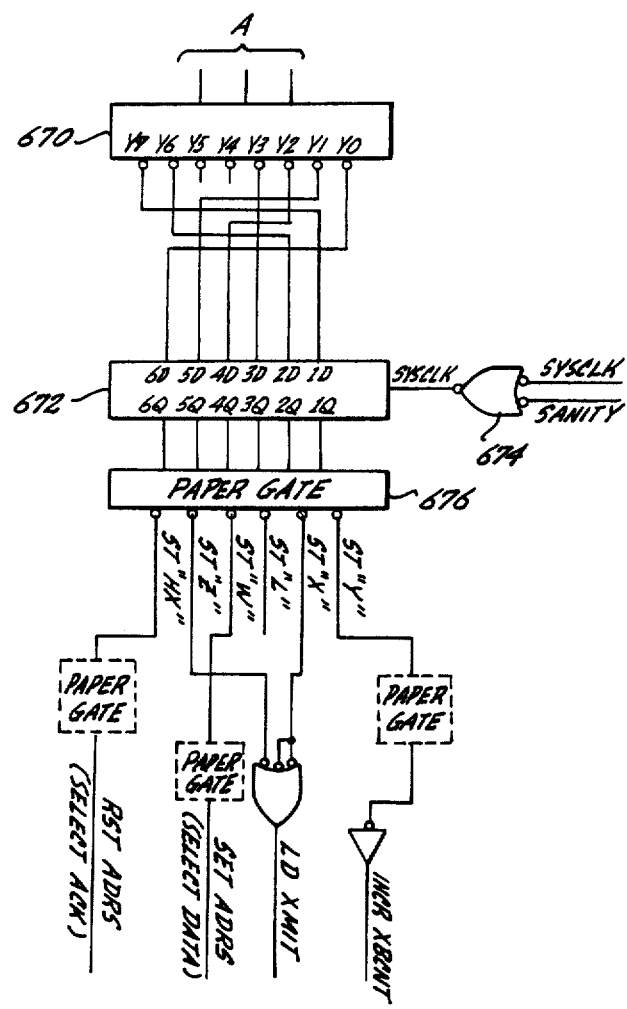
FIGS. 8A and B are detailed schematic diagrams illustrating the preferred construction of the controller for the transmit data controller processor.

Addressing to the multiplexers 551-558 is provided out of a binary counter 580, here, preferably a type 74LS161 integrated circuit. The state of counter 580 is incremented by an input signal INCR XBCNT, provided by the TXDC/P controller (FIGS. 8A and B). Counter 580 may be reset through a gate 582 via the SANITY signal 584 and the ST "HX" signal on line 586 as provided by the TXDC/P controller of FIGS. 8A and B.

The count of counter 580 is monitored by a 2-to-4 line decoder/demultiplexer 590 (type 74S139). The Y0 output from decoder 590 is a signal XBCNT0, whereas the Y3 output is a signal XBCNT3(L), and is inverted in inverter 592 to produce a singal XBCNT3(H).

The ACK and DATA READY signals out of line receiver 544 are processed through inverters 600, 601 and gates 602 and 603, respectively, before being applied to interrupt logic indicated generally at 610. Also, fed to the interrupt logic 610 is the SANITY signal, a clear data request, on line 621, and a clear acknowledge request, on line 622 provided out of logic indicated generally at 630. The indicated input signals to logic 630 are provided from the TXDC/P processor of FIGS. 8A and B.

The outputs from interrupt logic 610 are an ACK status signal and a DATA READY status signal which are fed to the inputs of a register 640 (type 74S175 integrated circuit). Also fed as inputs to register 640 are a signal TXFULL representative of the status of the TXCC holding register, and the signal XBCNT3(L) provided out of decoder 590.

Register 640 is clocked via a system clock line 642, and the SANITY signal, on line 644 through a gate 646.

The indicated latched output signals from register 640 are fed to the TXDC/P processor shown in FIGS. 8A and B.

FIGS. 8A and B are detailed schematic diagrams of the processor for the TXDC/P.

The various status signals out of the register 640 of FIGS. 7A–D are fed to the inputs of three 1-of-8 data selector/multiplexers 651–653 (type 74S151 integrated circuits). The signal output from multiplexers 651–653 are selected by three address lines 654. The state of the system is directed by three flip flops 661–663 (type 74S74 integrated circuits) which apply appropriate addresses to the address line 654. As shown, the flip flops 661–663 are cleared via the SANITY signal on line 664 and are clocked via the system clock signal SYSCLK as provided by the circuitry of FIGS. 11A–B.

The outputs from the flip flop 661–663 are applied as inputs to a 3-to-8 decoder 670 (type 74S138 integrated circuit) which serves as the state decoder.

The outputs from the decoder 670 are passed as inputs to a register 672 (type 74S174 integrated circuit). Register 672 is clocked via the SYSCLK signal and the SANITY signal, as passed through the gate 674. Register 672, thus, latches the state of the system to its output on receipt of the clock signal.

The output from register 672 comprises the various control signals used to control the TXDC/P of FIGS. 7A–D, as well as producing the LDXMIT signal for use with the TXCC. These signals are shown passing through a paper gate 676 which, here, is merely a conceptual tool.

FIGS. 9A–D are detailed schematic diagrams of the preferred construction of the transmit communication controller, adapted for interface with an RF modem. Here, the eight data bus lines from the TXDC/P (570 in FIGS. 7A–D) enter over the eight line bus 700. These signals are applied at the inputs of a latching, holding register 710 (type 74S374 integrated circuit). The data is clocked through register 710 upon receipt of a LDXMIT signal from the TXDC/P.

The data out of register 710 is loaded into a pair of 8-bit shift registers 720, 722 (type 74S165). This data is then parallel-to-serial converted by sequential clocking, via the clock input control signal STXCLK at the clock inputs. The SHIFT/LOAD inputs to registers 720, 722 are controlled by logic indicated generally at 730, having the control inputs as shown. Further, the clock inhibit inputs of the registers 720, 722 are controlled by logic indicated generally at 740 having the indicated inputs.

A synchronous 4-bit counter 750 (type 74LS161) keeps track of the number of bits counted out of the registers 720, 722. When the full 11-bits have been counted out, output logic, indicated generally at 760, produces an appropriate control signal which is routed to the processor portion as described below.

The serial data out of the registers 720, 722 can then be suitably processed for transmission over a single line.

The LDXMIT signal from the TXDC/P is also passed to the input of a timer 770 (type 74LS123). The timer, via external circuitry 772, produces an output pulse after a predetermined time period, corresponding to the time required for the TXCC to process the 8-bit input on data bus 700. The produced TXFL signal is then passed back to the TXDC/P, indicating that the TXCC is busy, i.e., it is not prepared to process more bits of information. When this signal changes state (to TXHRE) this indicates that the TXCC is prepared to accept another byte.

The processor portion of the TXCC includes a quad D flip flop 780 (type 74S175), a pair of 4-to-1 selector/multiplexers 782, 784, (type 74S153), a pair of D flip flops 786, 788 (type 74S74), a 2-to-4 line decoder/demultiplexer 780 (type 74S139) and a quad D flip flop 792 (type 74S175).

The quad D flip flop 780 and multiplexer 782, 784, with the inputs as shown, provide input forming logic for the processor.

The D flip flops 786, 788 and the decoder 790 comprise the state controller portion of the processor, with this output state being latched in the latch 792. The output signals from latch 792 are, thus, the control signals used to control operation of the TXCC.

Figure 9A:
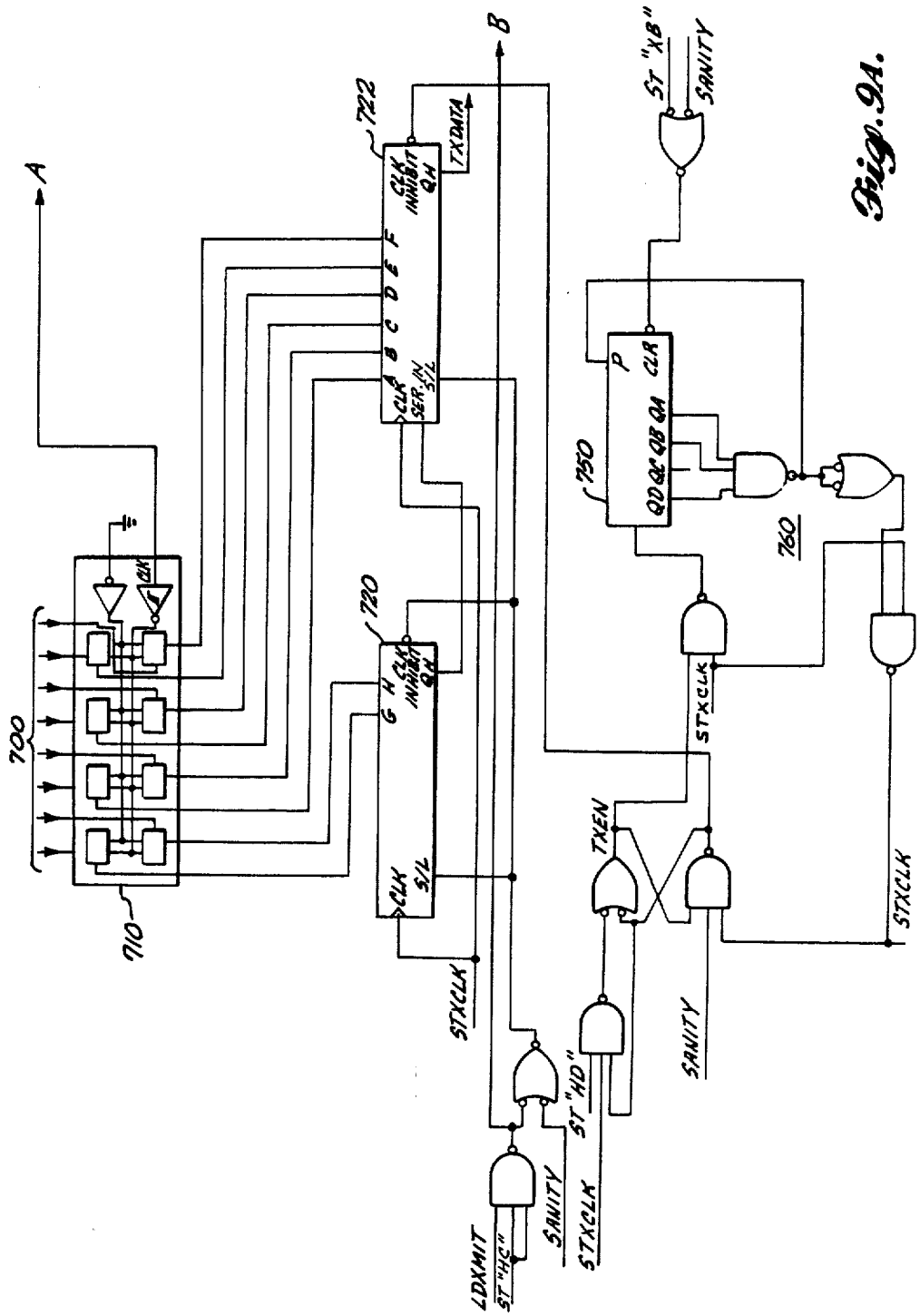
Figure 9B:
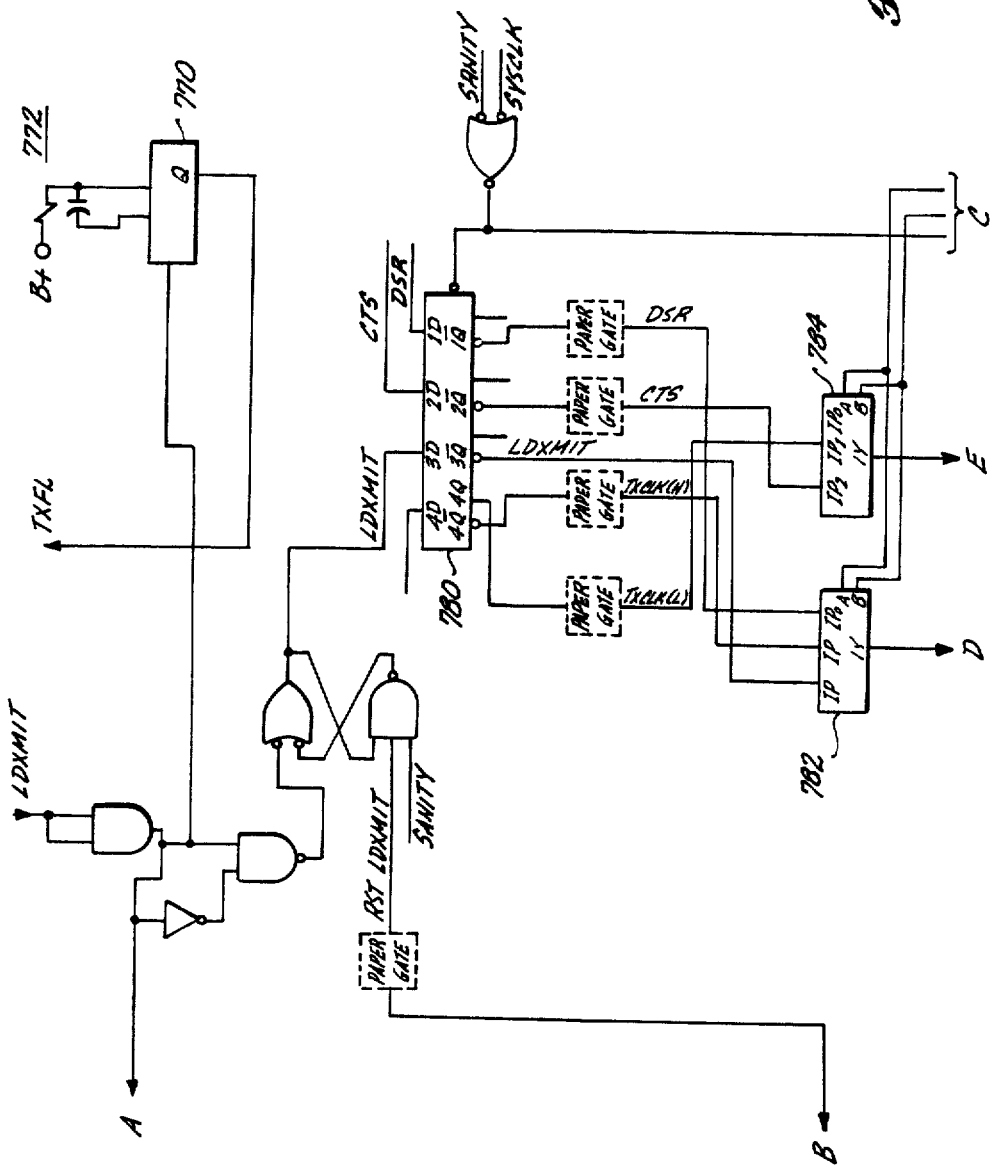
Figure 9C:
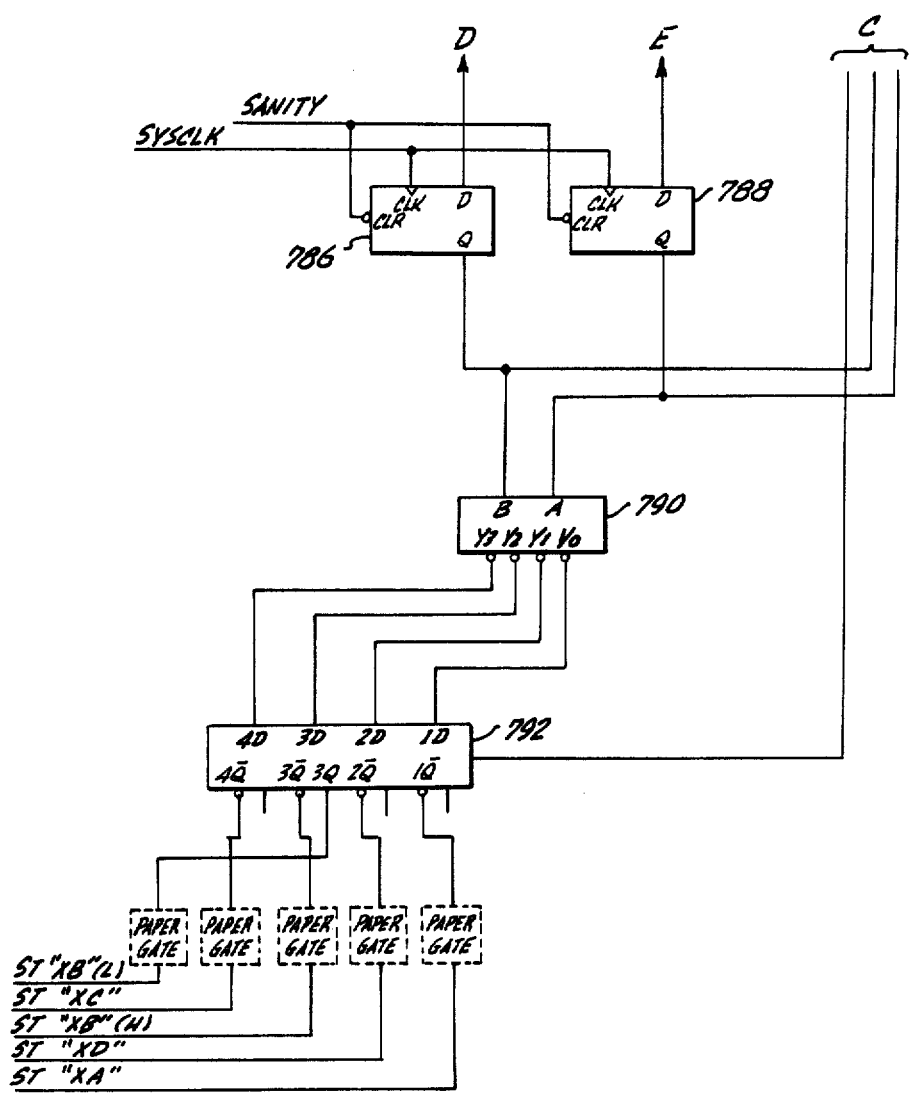

The serial data as provided by the circuit of FIGS. 9A–C is next transmitted to a conventional RF data modem (not shown). Each 8-bit byte of data to be processed is loaded into a pair of latching registers 800, 802 (type 74LS175).

Figure 10A:
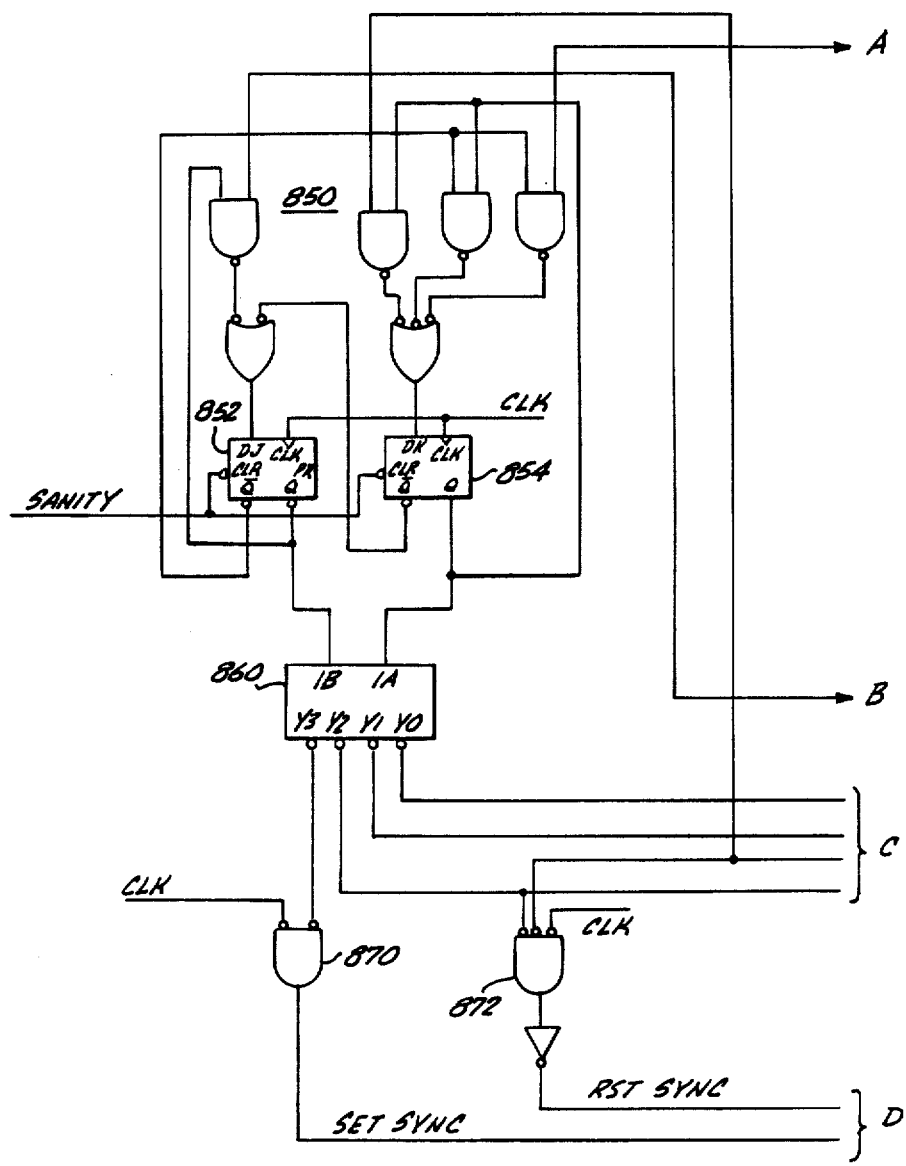
FIGS. 10A-C are detailed schematic diagrams of the universal synchronous transmitter and Manchester encoder for use with a fiber optic link.
Figure 10B:
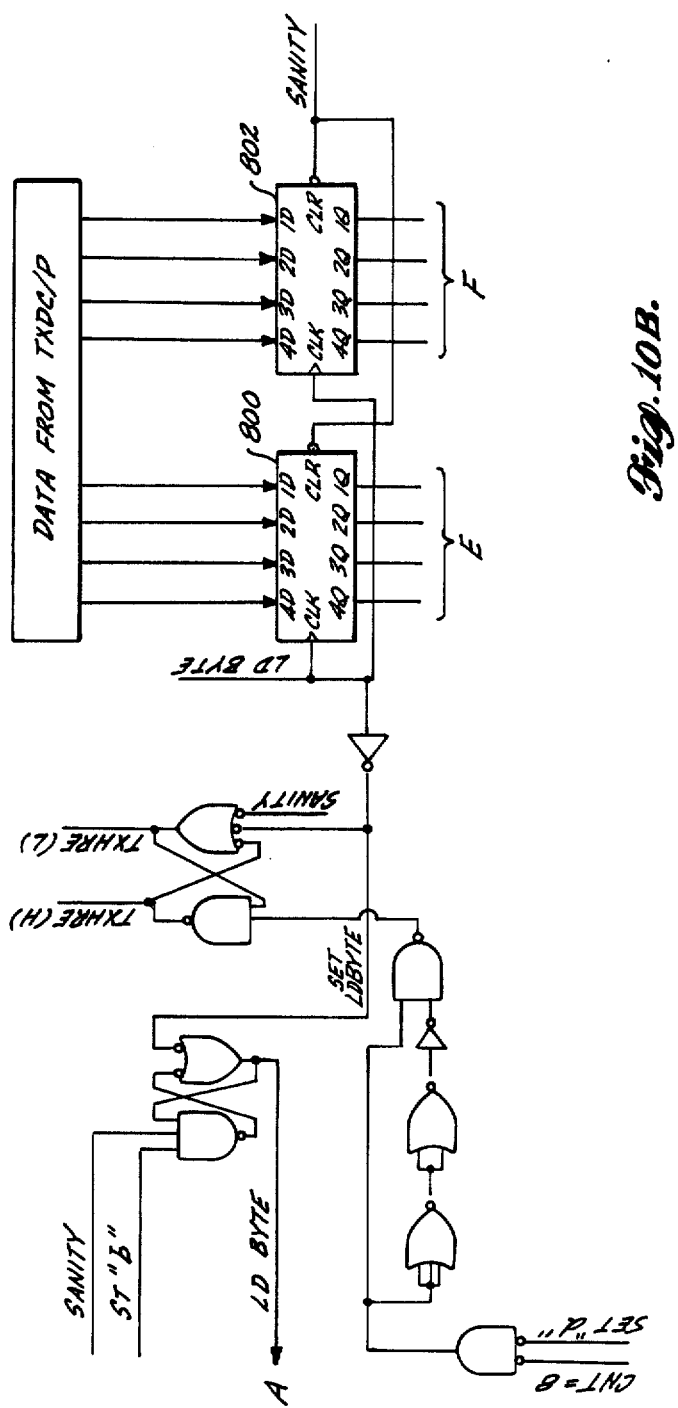
Figure 10C:
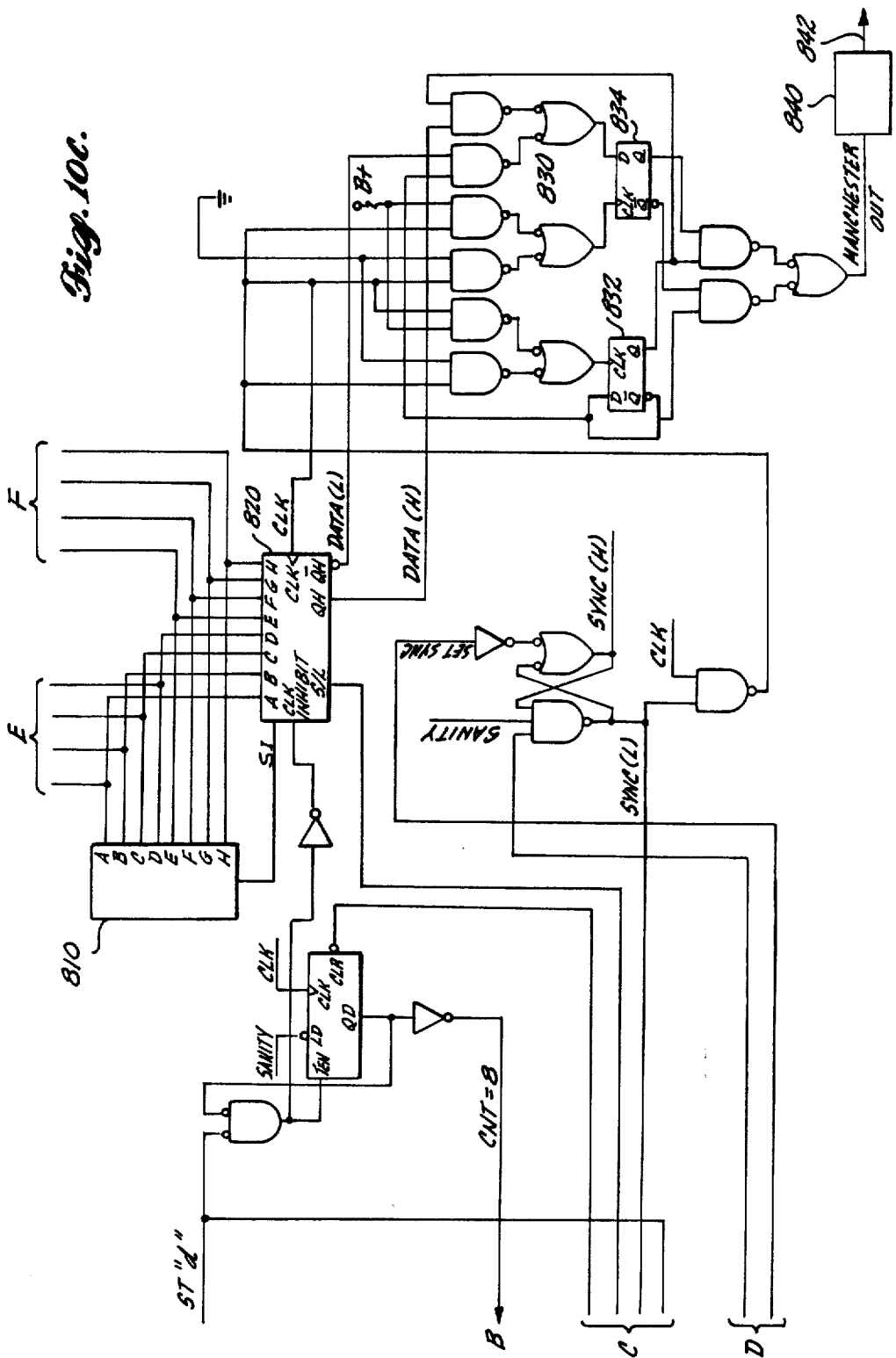

FIGS. 10A–C are a detailed schematic diagram of the TXCC for use with a fiber optic link.

Here, the 8-bit data signal from the TXDC/P is fed to registers 800, 802 (type 74LS175 integrated circuits). The data bits out of the registers 800, 802 are fed to a parity generator 810 (type 74S280). The resulting 8-bit with parity signal is loaded into a parallel-to-serial shift register 820. There, the data is shifted out, in differential form, in response to a clock CLK signal.

The resulting serial bit stream is fed to a Manchester encoder, indicated generally at 830. Manchester encoder 830 is comprised of input logic gates, as illustrated, which feed to a pair of D flip flops 832, 834 (type 74S74). Sync logic circuitry 836 as processed through encoder circuitry 830, 832 and 834 suppresses one clock transition to thereby provide a syncing signal. The resulting serial, encoded bit stream out of the Manchester encoder 830 is then fed to electro-optical transducer 840, for application of the signal to a single line transmission link 842 for transmission thereover.

The processor portion of the encoder includes input forming logic 850, and a state decoder 860. The input forming logic is comprised of a configuration of gates, as shown, which feed to the D inputs of D flip flops 852, 854 (type 74S74).

The state decoder is comprised of a 2-to-4 line decoder/demultiplexer 860 (type 74S139). The decoder 860 produces, in association with gates 870, 872 the various control signals used for the encoding system of FIGS. 10A-C.

Figure 11A:
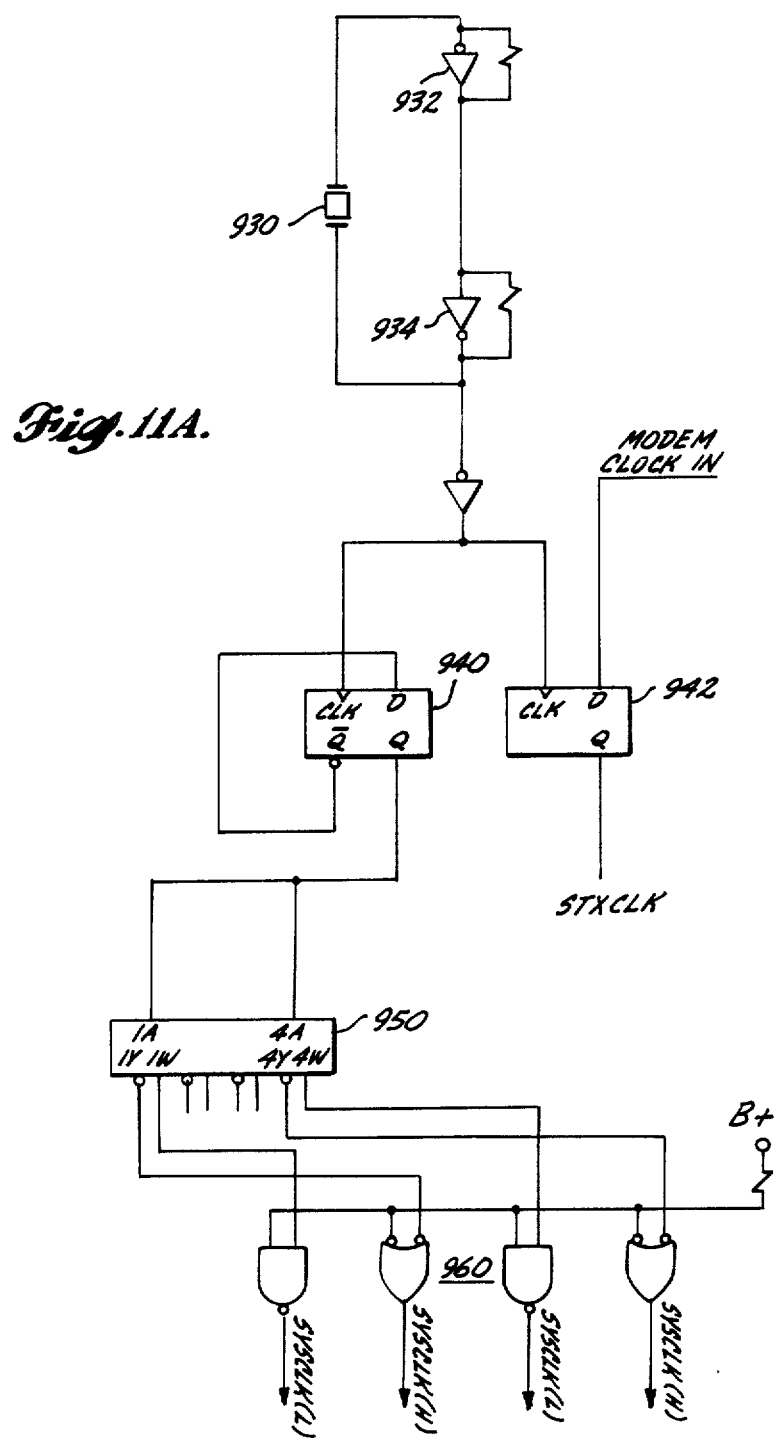
FIGS. 11A and B are detailed schematic diagrams illustrating the preferred construction of the power-up sanity system for the transmit data controller processor and the transmit data communication controller.
Figure 11B:
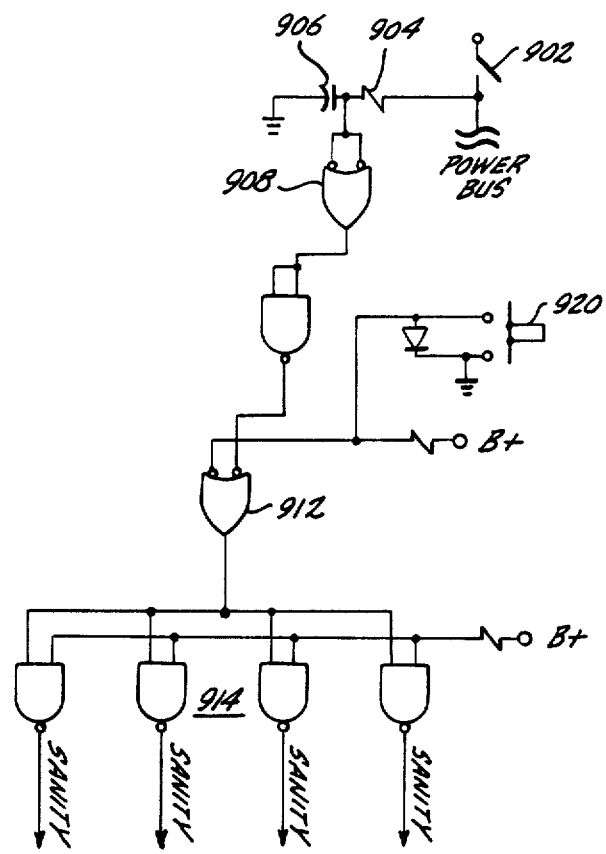

FIGS. 11A and B are detailed schematic diagrams of the power-up sanity system and the system clock for use with the TXDC/P and TXCC.

A power-up switch 902 is thrown to apply bias DC voltage to the system's power bus. A timing circuit, comprising resistor 904, capacitor 906 and gate 908 produce a pulse which is delayed a predetermined time interval from the time that power switch 902 is thrown. This signal is passed through gates 910 and 912 for application to output gates 914 which produce the various sanity signals as used throughout the TXDC/P and TXCC.

Also, a front panel reset switch 920 may be thrown to initiate the various sanity signals.

The basic system clock is comprised of a crystal 930 which is in circuit configuration with gates 932, 934 to produce an oscillating clock signal. Where modems are being used to couple the serial bit streams to and from the interconnecting data links, a sync circuit comprised of a pair of D flip flops 940, 942 (type 74S74) may be used.

The clock signal is then fed to a complimentary output driver 950 (type 74265), whose outputs drive a series of gates 960. These gates, then, produce the various system clock signals used by the TXDC/P and TXCC.

Figure 12A:
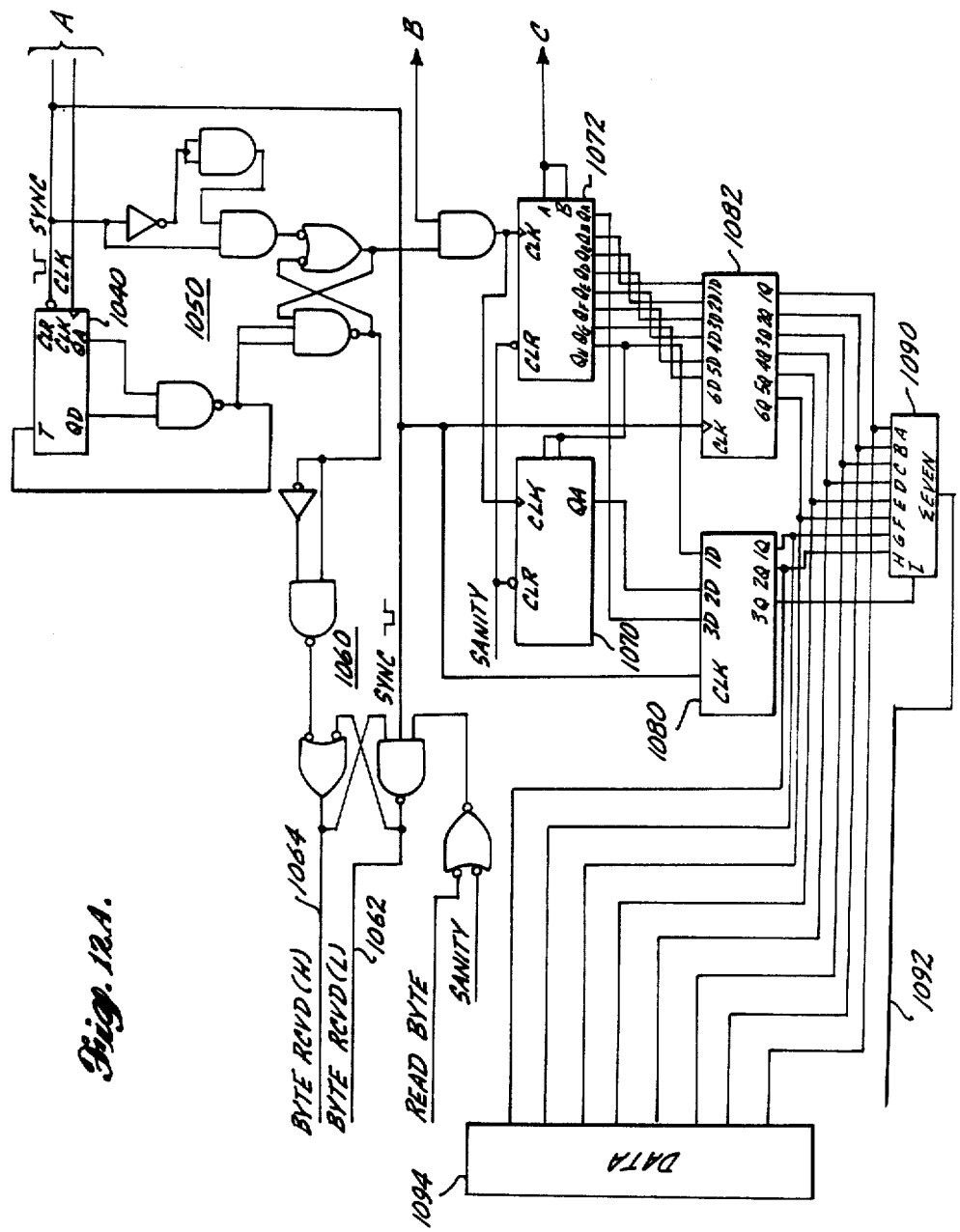
FIGS. 12A and B are detailed schematic diagrams illustrating the preferred construction of the universal synchronous receiver and Manchester demodulator for use with a fiber optic link.
Figure 12B:
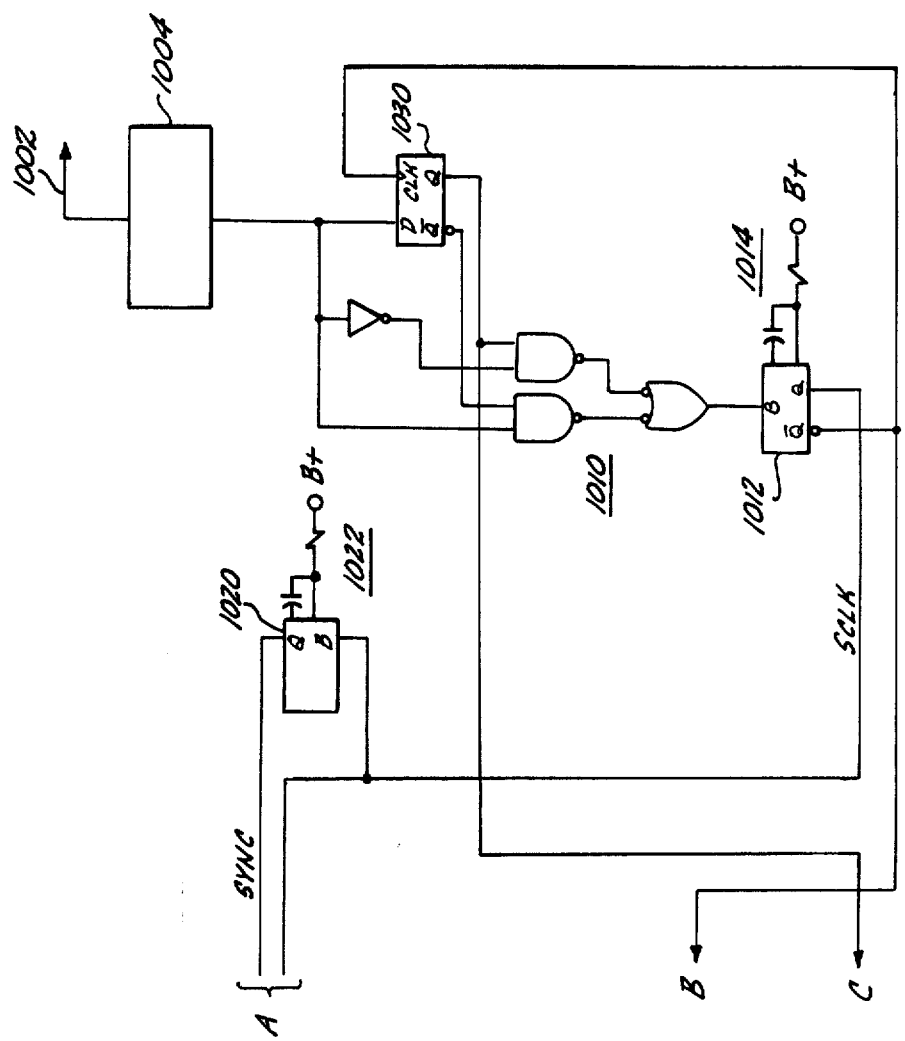
Figure 13A:
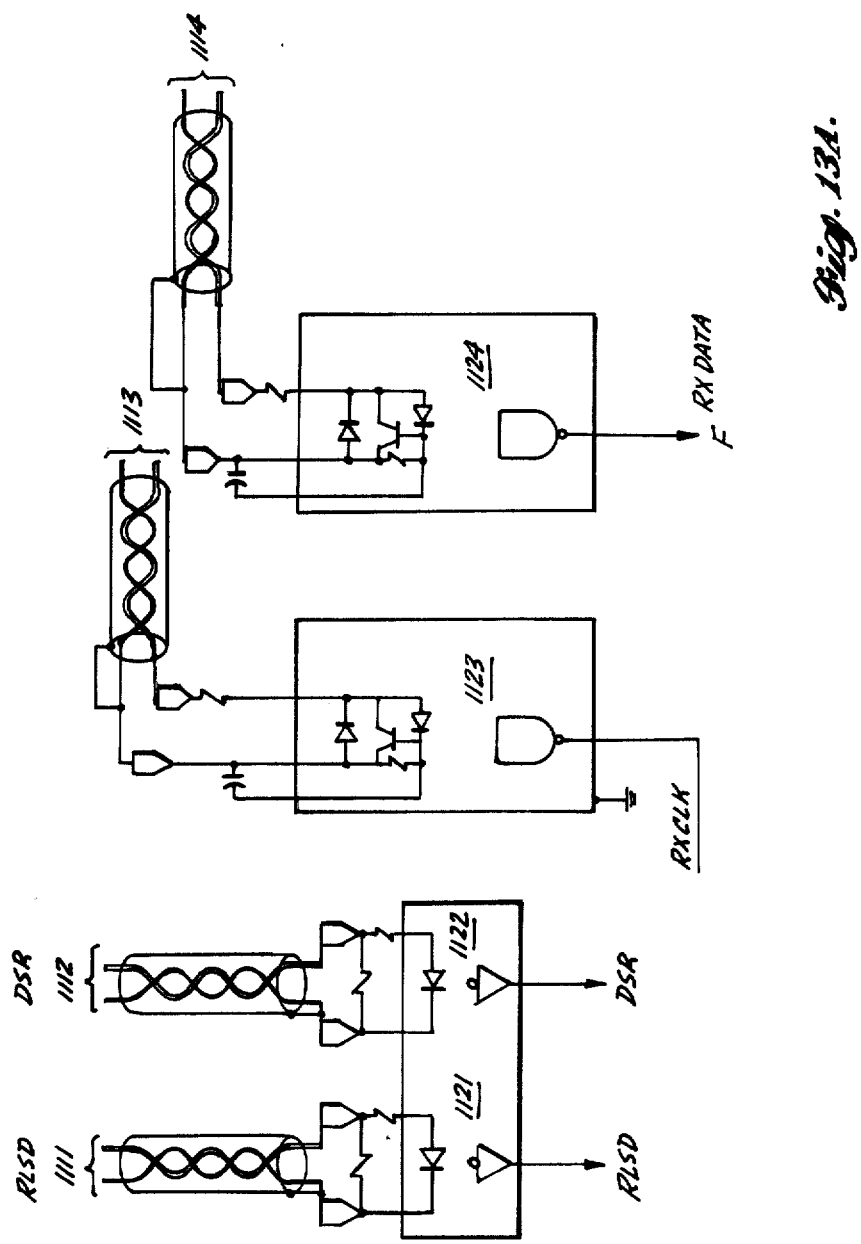
FIGS. 13A-D are detailed schematic diagrams illustrating the preferred construction of the receive data communication controller for use with an RF modem.
Figure 13B:
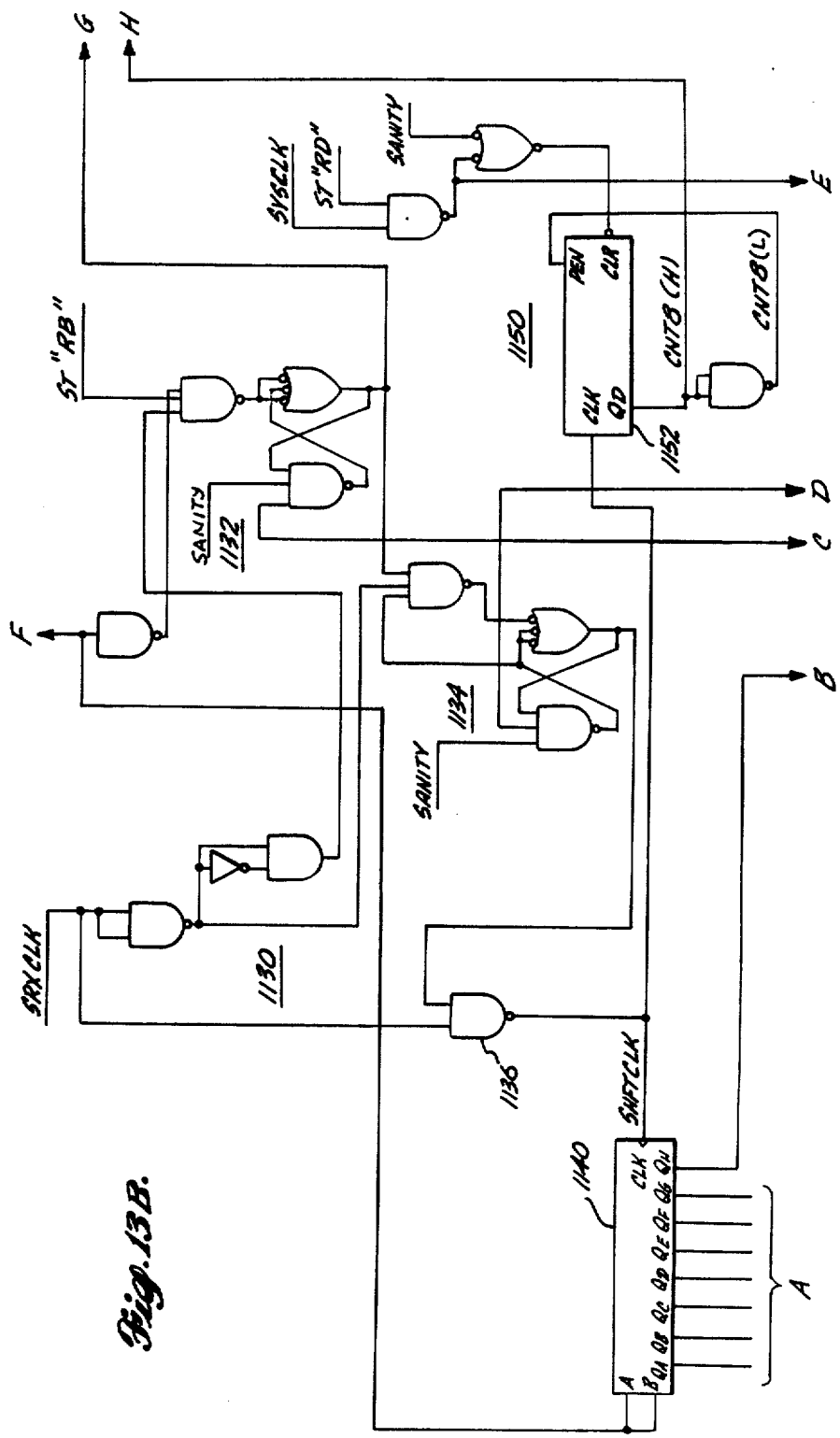
Figure 13C:
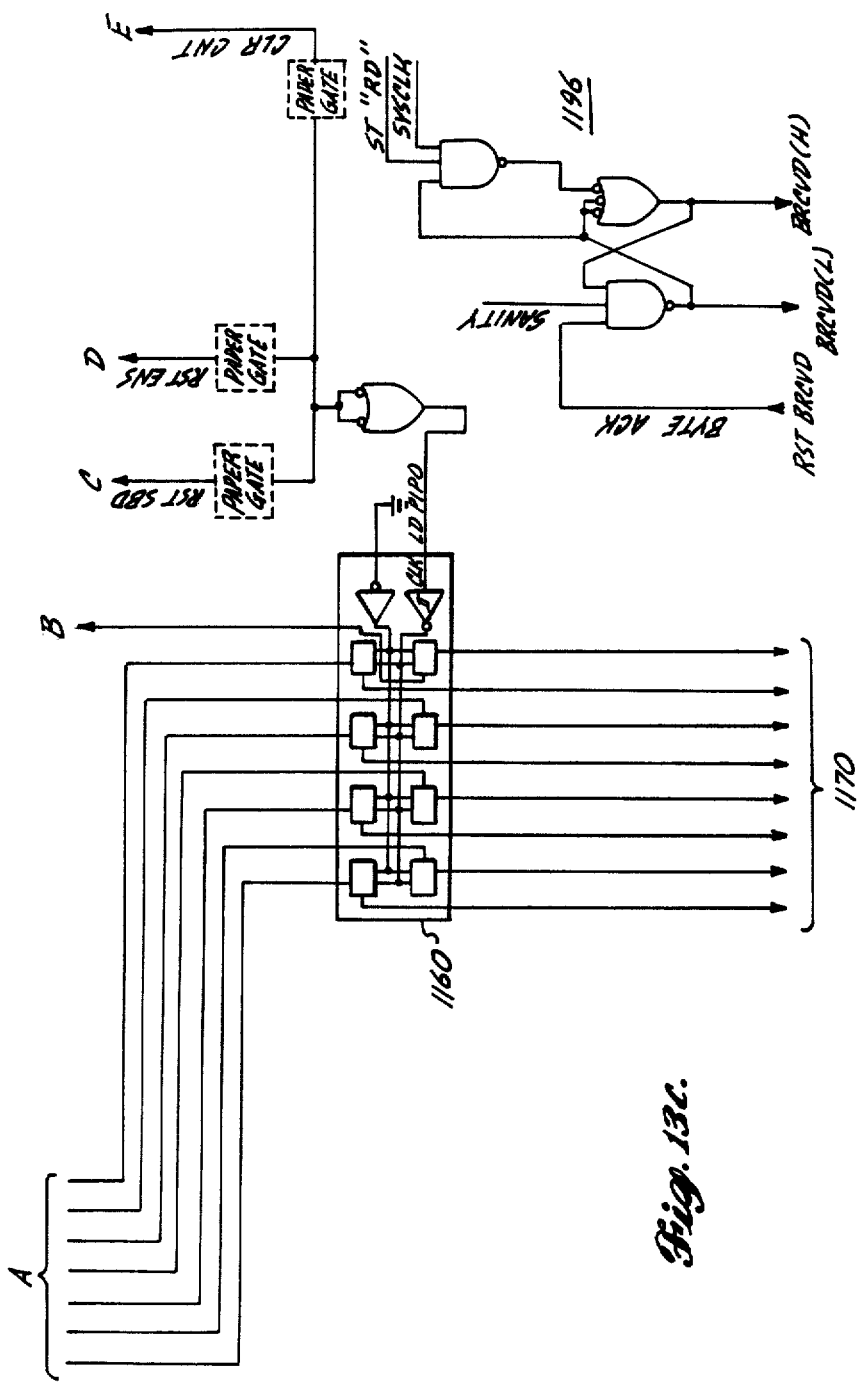
Figure 13D:
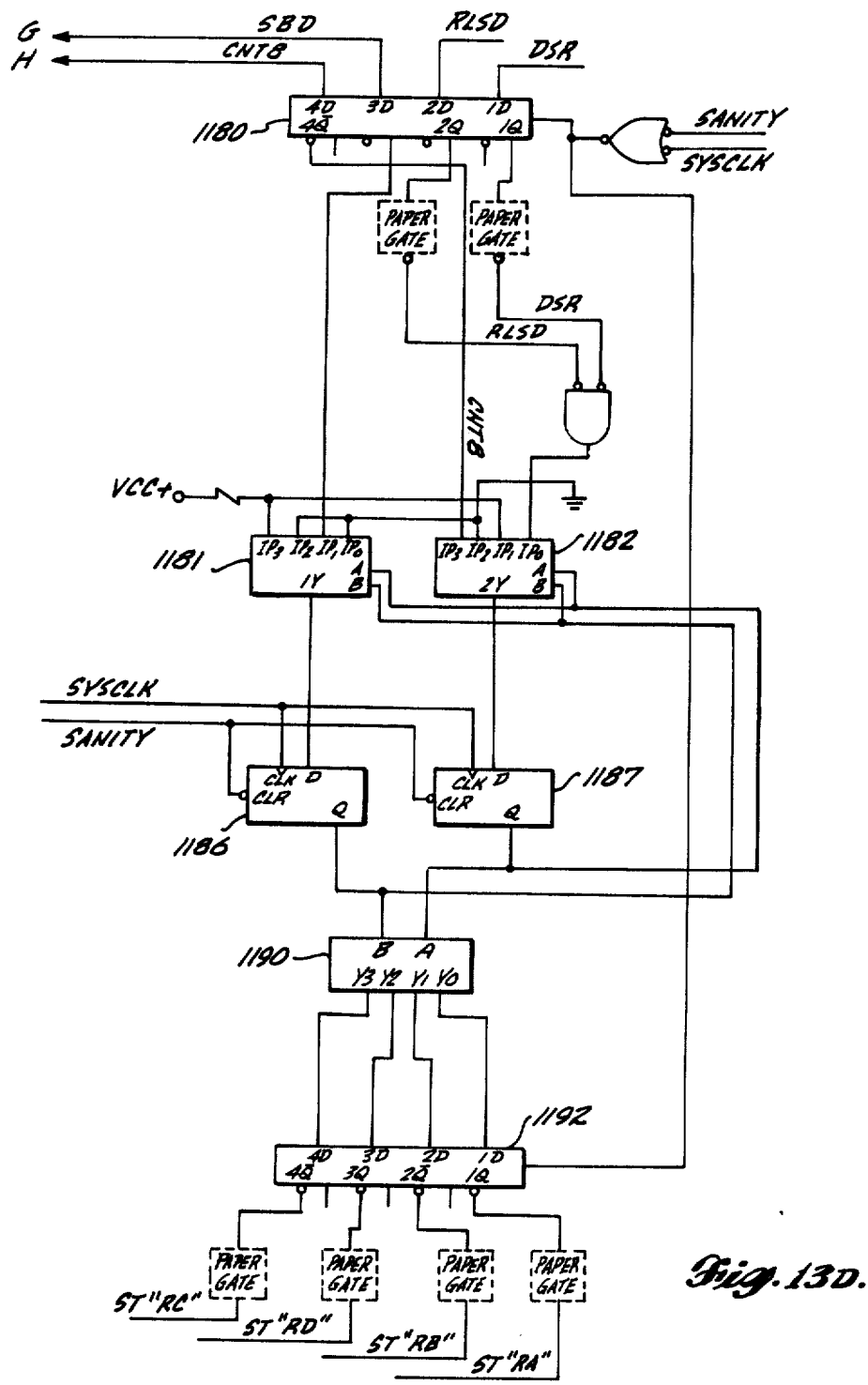

FIGS. 12A and B are detailed schematic diagrams of the decoding portion of the RXCC, for use with a fiber optic transmission link.

The encoded, serial bit stream carried over a link 1002 from a TXCC, is processed through circuitry 1004 to produce a corresponding electrical signal. Thus, where line 1002 is a fiber optic link, the circuitry 1004 includes an electro-optical transducer.

The input data stream is then checked to make certain that it includes the sync signal indicating the intitial portion of a received transmission.

Clock recovery of the input data stream is accomplished via logic gates 1010 and a multivibrator 1012 (type 74LS123). Timing circuitry 1014 associated with multivibrator 1012 causes the multivibrator to produce an output signal SCLK which runs at the system clock frequency. The multivibrator 1012 is synchronized to the input data stream frequency via logic circuitry 1010. This recovered clock signal is fed to a multivibrator 1020 (type 74LS123) having associated timing circuitry 1022. If a clock edge is missing from the signal SCLK as fed to multivibrator 1020, it produces an output sync signal SYNC.

The clock signal SCLK is also fed to the clock input of a D flip flop 1030 (type 74S74). The Q output from flip flop 1030 is, thus, the recovered data from the input data stream.

The SYNC signal and the inverted clock signal are fed to the clear, and clock inputs, respectively, of a 4-bit binary counter 1040 (type 74LS161A). The binary counter 1040 and associated logic circuitry 1050 the comprise counting circuitry and shift clocking in conjunction with logic indicated generally at 1060.

Logic circuitry 1060, in response to the indicated inputs, produces low and high byte received signals on lines 1062, 1064, respectively. These signals are then fed to the RXDC/P indicating that a byte of information has been received.

The recovered data and clock signals are then passed to a pair of 8-bit parallel out, serial shift registers 1070, 1072. The shift registers serial-to-parallel convert the data, whereby it is applied to a pair of Hex D flip flops 1080, 1082, respectively (type 74LS174). Parity of the recovered 8-bit byte is checked by an odd/even parity checker 1090. In the event that a parity error is detected, the checker 1090 activates an output line 1092.

The fully decoded 8-bit parallel byte appears at an output bus 1094.

FIGS. 13A-D are detailed schematic diagrams of the RXCC for use with an associated RF modem, when the transmission link is an RF line.

The associated modem (not shown) provides four wire pairs 1111-1114. The first two wire pairs 1111, 1112 correspond to receive line signal detect (RLSD) and dataset ready (DSR). They are converted to single ended signals via the optical coupling networks 1121 and 1122, respectively.

The signal on wire pair 1113 corresponds to the recovered modem clock signal. This signal is converted to a single ended output via the optical coupling circuitry 1123.

Finally, the signal on the wire pair 1114 corresponding to the received data is converted to a single ended signal through the optical coupler network 1124.

The received clock signal RXCLK out of network 1123 is passed to the system master clock (FIGS. 16A and B) where it is synchronized to produce the synchronized signal SRXCLK.

The synchronized clock signal, along with the received data signal out of network 1124 are processed through logic 1130, 1132 which detect the presence of a start bit. The start bit detect signal out of logic circuitry 1132 is processed through logic circuitry 1134 to produce an enable shift signal ENS. This signal, along with the synchronized clock signal, is passed through a gate 1136 to produce a clock signal which is applied to the clock input of an 8-bit parallel out, serial shift register 1140 (type 74LS164). Register 1140 receives at its inputs the serial received data RXDATA which is sequentially clocked in. Counting circuitry 1150, including a 4-bit counter 1152 (type 74LS161) counts the number of bits being loaded into register 1140. When a total of 8-bits have been loaded, a control signal CNT8 is produced. This signal, as processed through the processor, described below, results in a load signal LDPIPO which is sent to an octal D flip flop 1160 (type 74S374). Thus, the 8-bit byte is serial-to-parallel converted and appears at an output bus 1170 for transmission to the RXDC/P.

The processor portion of the RXCC includes input forming logic, comprised of a quad D flip flop 1180 (type 74S175) and a pair 1181, 1182 of 4 line-to-1 line multiplexers (type 74S153).

The output from the input forming logic feeds to a state controller, here comprised of a pair of D flip flops 1186, 1187 (type 74S74).

A state decoder is comprised of a 2-to-4 line decoder 1190 (type 74S139).

The output state of the system is latched via a quad D flip flop 1192 (type 74S175). The state of the RXCC is, thus, controlled by the output signals produced by quad flip flop 1192.

In addition, logic circuitry 1196 responds to the indicated input signals to produce the byte receive signal BRCVD which is sent to the RXDC/P.

Figure 14A:
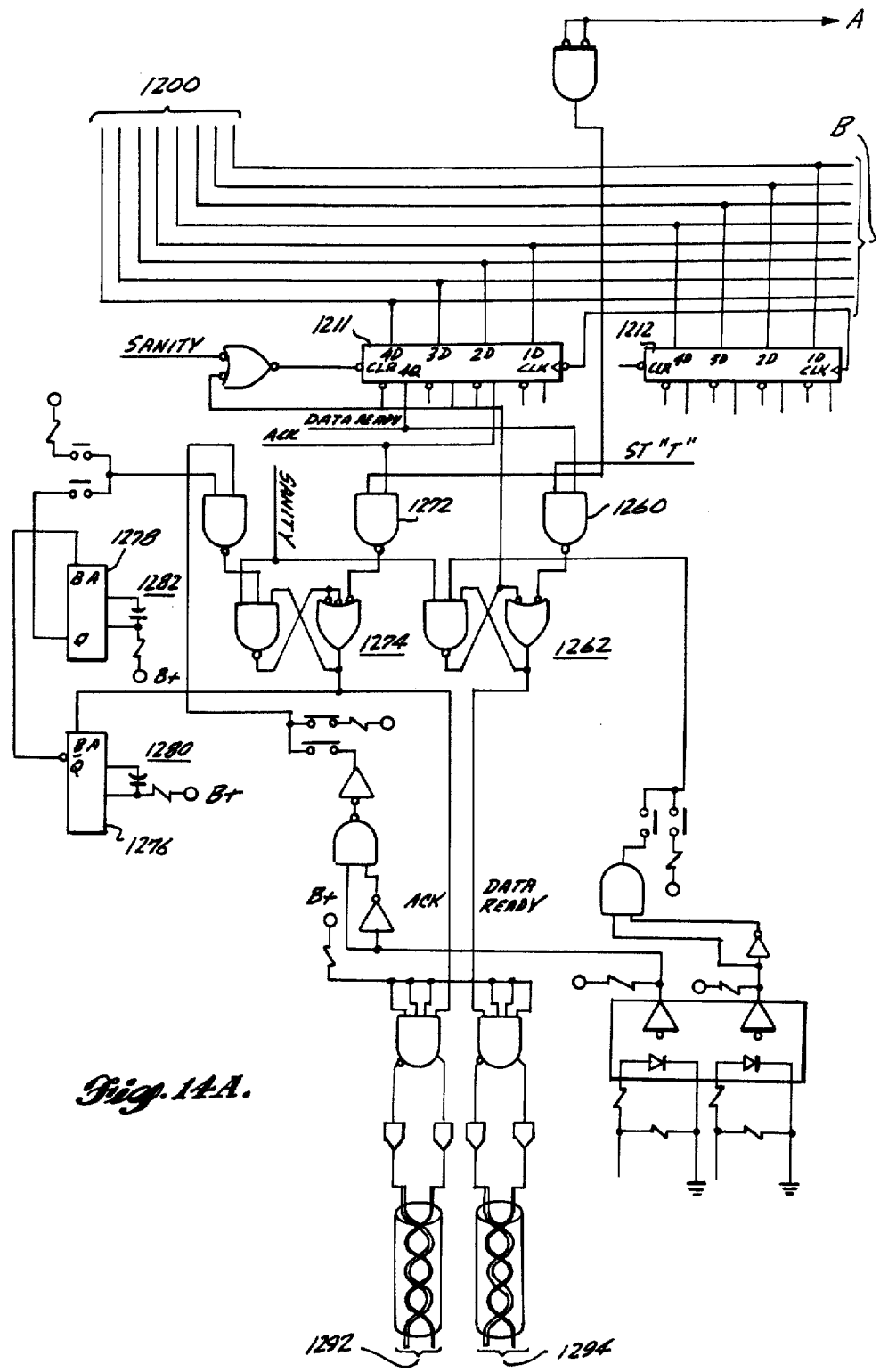
FIGS. 14A-C are detailed schematic diagrams illustrating the preferred construction of the receive data controller processor.
Figure 14B:
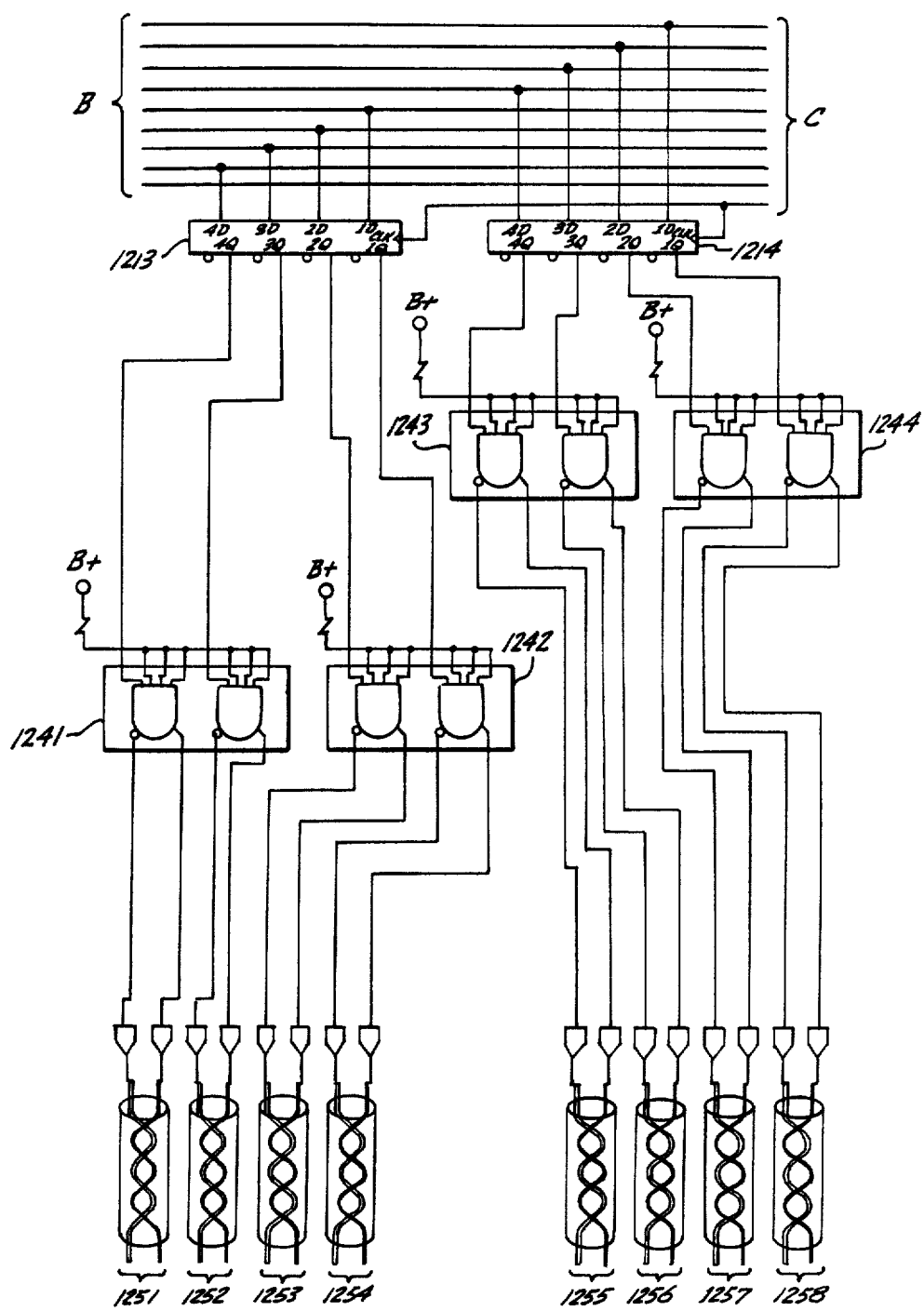
Figure 14C:
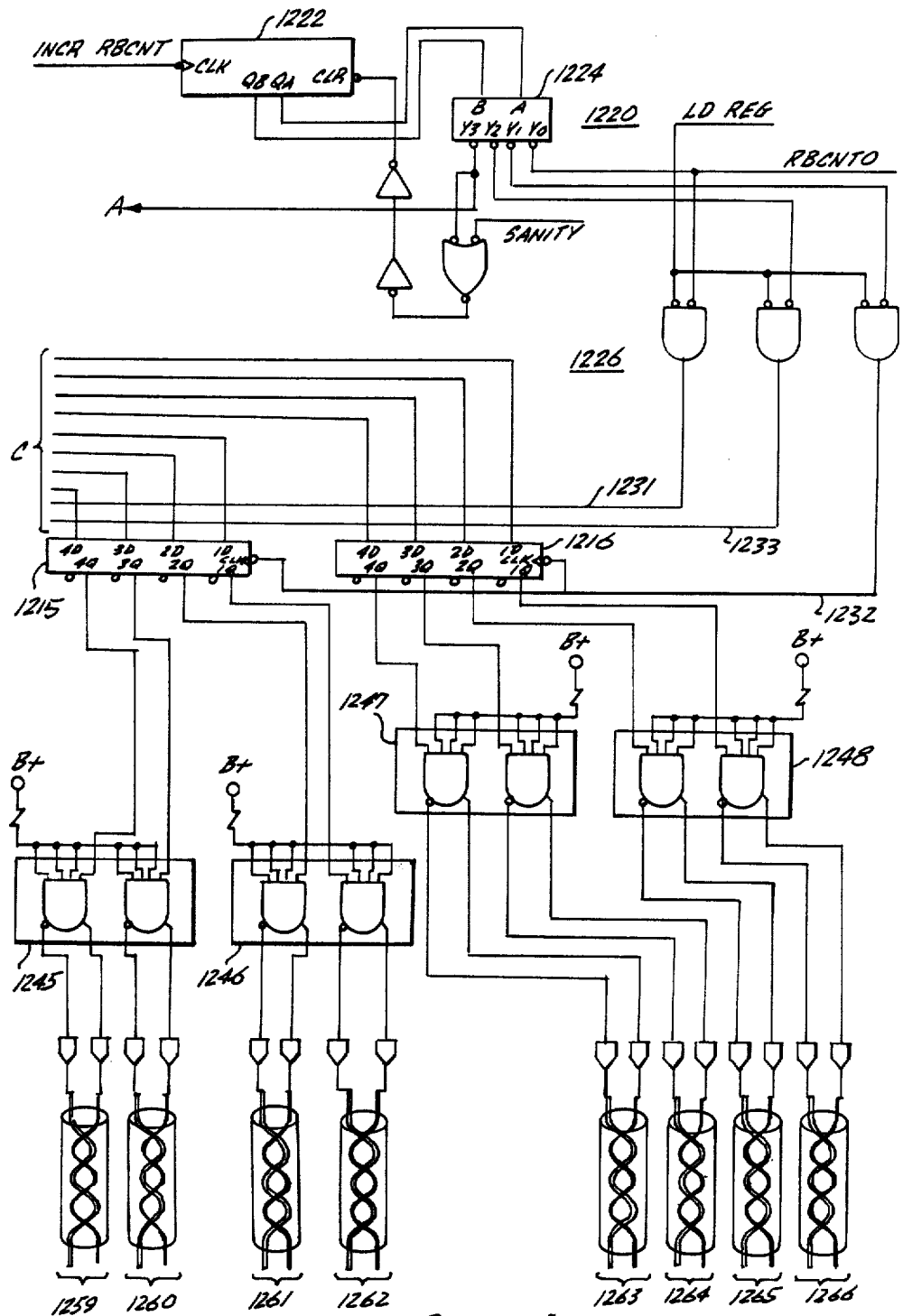

FIGS. 14A-C are detailed schematic diagrams of the RXDC/P circuitry.

Here, the 8-bit data byte from the RXCC is received on an input data bus 1200.

Six quad D flip flops 1211-1216 (type 74S175) have their inputs connected to selected lines on the bus 1200. The flip flops 1211, 1212 receive the protocol byte; flip flops 1213 and 1214 receive most significant byte; and flip flops 1215 and 1216 receive the least significant byte.

Data bits on the data bus 1200 are loaded into the flip flops 1211-1216 in response to addressing circuitry, indicated generally at 1220. The addressing circuitry includes a 4-bit counter 1222 (type 74S161) a 2-to-4 line decoder/demultiplexer 1224 (type 74S139) and output logic gates 1226. The logic performed by the addressing circuitry 1220 corresponds to the fact that if the first byte received is a protocol byte corresponding to a DATA READY condition, then, the following two bytes will correspond to the lower and upper bytes of the 16-bit data signal.

Thus, the 4-bit counter 1222 receives a clock signal INCR RBCNT each time a successive one of these data bits is received. The increased count state of counter 1222 results in a change in the output of decoder 1224.

Upon receipt of the first clock signal, the addressing circuit 1220 will activate its LD PROTOCOL line 1231. Protocol line 1231 connects to the clock input of registers 1211, 1212 which respond to the clock signal by loading in the present 8-bit byte on the data bus 1200. The next increment clock signal causes the LD LOW BYTE line 1232 to be activated, thereby causing the present 8-bit byte on data bus 1200 to be loaded into registers 1215, 1216.

Finally, the third increment clock signal to the address circuitry 1220 activates a LD UPPER BYTE line 1233, thereby loading the present 8-bit byte on data bus 1200 into registers 1213, 1214.

The outputs from data registers 1213-1216 feed to a series of 8 dual differential line drivers 1241-1248. Drivers 1241-1248 convert the single ended input bit signals to corresponding differential outputs which are sent to the associated data processing unit via wire pairs 1251-1266.

With respect to the protocol signals out of the protocol registers 1211, 1212, in the present system an activated 2Q output from register 1211 corresponds to a DATA READY control signal, whereas an activated 4Q output from register 1211 corresponds to an ACK control signal.

The ACK activated output from register 1211 is coupled, along with a control signal through a gate 1260, to logic circuit 1262 which produces the ACK control signal.

An activated 2Q output from register 1211 is coupled to a logic gate 1272 along with a control signal. The output from gate 1272 is applied to control circuitry 1274. In the case of the DATA READY signal, the desired control output signal is a pulse. As such, the output from logic circuitry 1274 is applied as an input to a pair of multivibrators 1276,1278 (type 74LS123). The multivibrators 1276, 1278, with their associated timing circuitry 1280, 1282, respectively, produce the output pulse corresponding to the DATA READY signal.

Both the ACK signal and the DATA READY signal are converted to differential form via a dual line driver 1290 before being coupled to the output control line pairs 1292, 1294, respectively.

The switches 1296, 1297 and 1298 are device strapping options for selection of half or full duplex operation.

For full duplex operation, a control signal ST "HR" from the RXDC/P is coupled through optical coupler 1299 and switch 1296 to the logic 1274 and resets the logic 1262. The ST "HR" signal is also passed through switch 1297 to reset logic 1274.

Figure 15A:
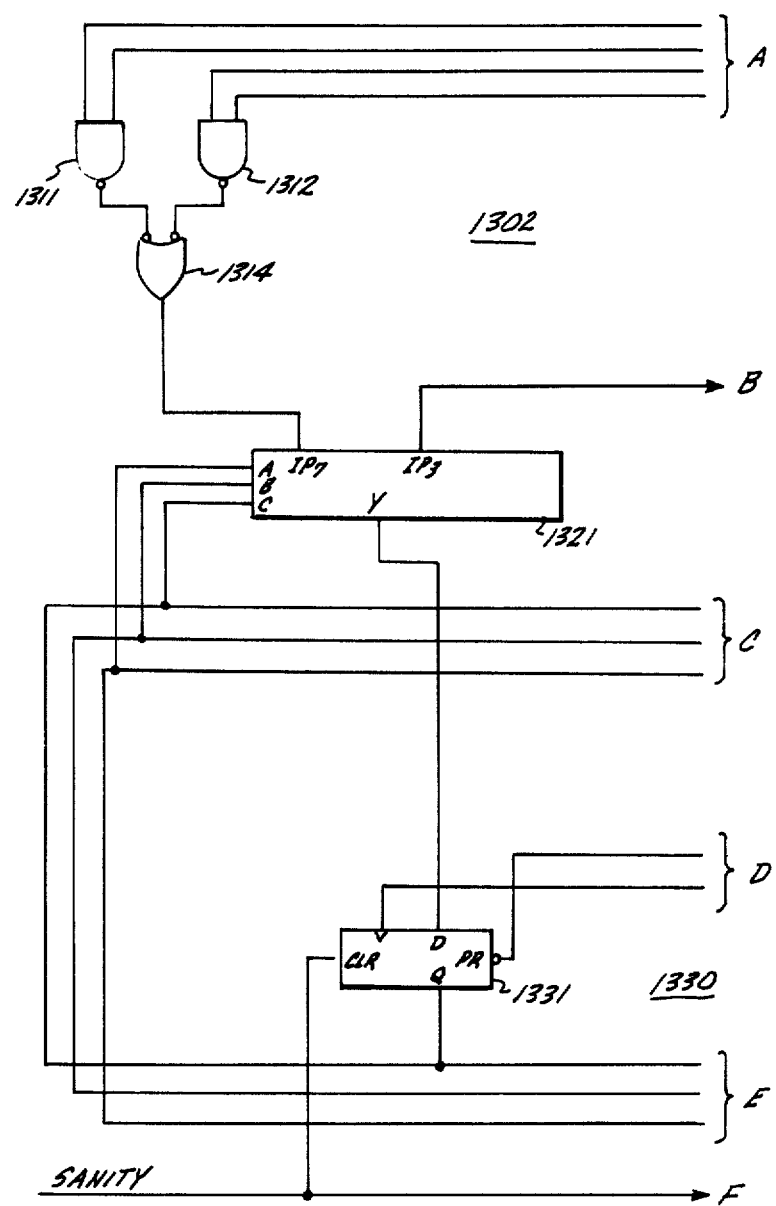
FIGS. 15A-C are detailed schematic diagrams illustrating the preferred construction of the processor for the receive data controller processor.
Figure 15B:
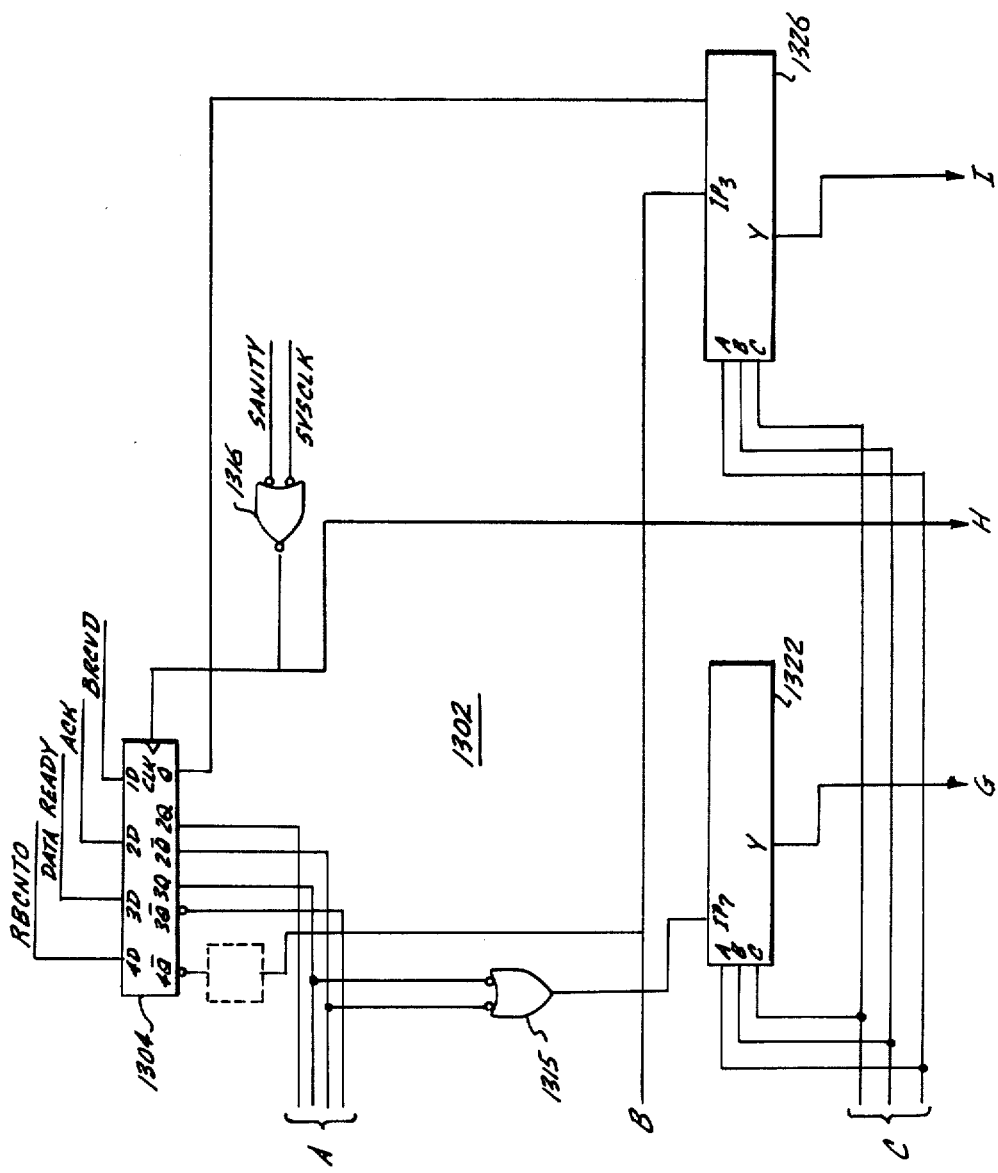
Figure 15C:
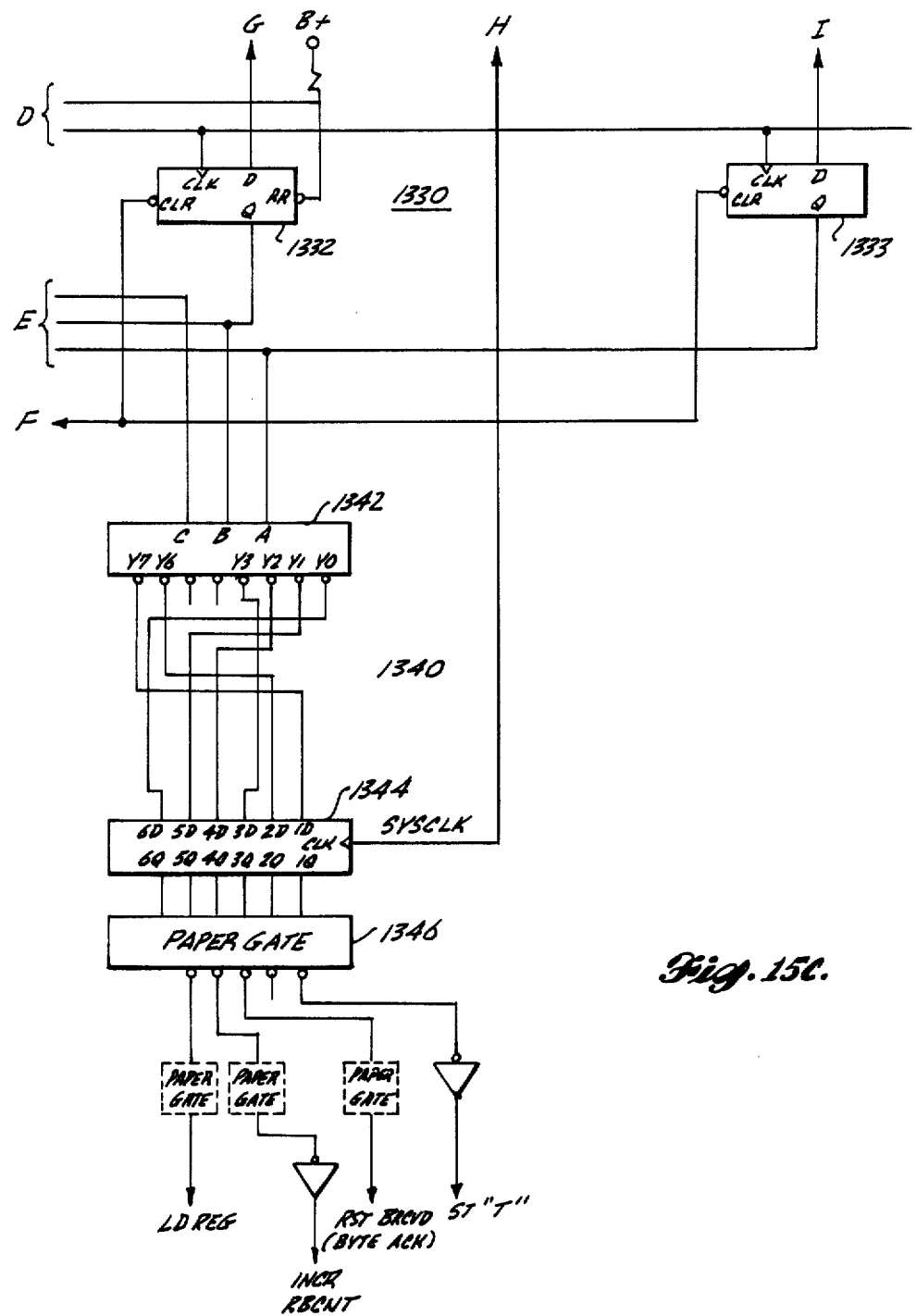

FIGS. 15A-C are detailed schematic diagrams of the processor portion of the RXDC/P.

The processor is comprised of input forming logic, indicated generally at 1302, and includes a quad D flip flop 1304 (type 74S175) which receives control signals from the RXDC/P circuitry of FIGS. 14A-C, and a bit receive signal BRCVD from the RXCC circuit of FIGS. 13A-D. Additional portions of the input forming logic include the logic gates 1311-1316 and three 1-of-8 selector/multiplexers 1321-1323 (type 74S151).

The outputs from the input forming logic 1302 are passed to a state controller, indicated generally at 1330. The state controller is comprised of three D flip flops 1331-1333 (type 74S74).

The remaining portion of the processor circuitry is output forming logic, indicated generally at 1340. This circuitry includes a 3-to-8 line decoder 1342 (type 74S138), and a hex D flip flop 1344 (type 74S174).

The output signals from the hex flip flop 1344 are passed through a conceptual paper gate 1346 corresponding to the various control signals as used by the circuit of FIGS. 14A-C and the byte received signal BRCVD as applied to the RXCC circuit of FIGS. 12A and B.

Figure 16A:
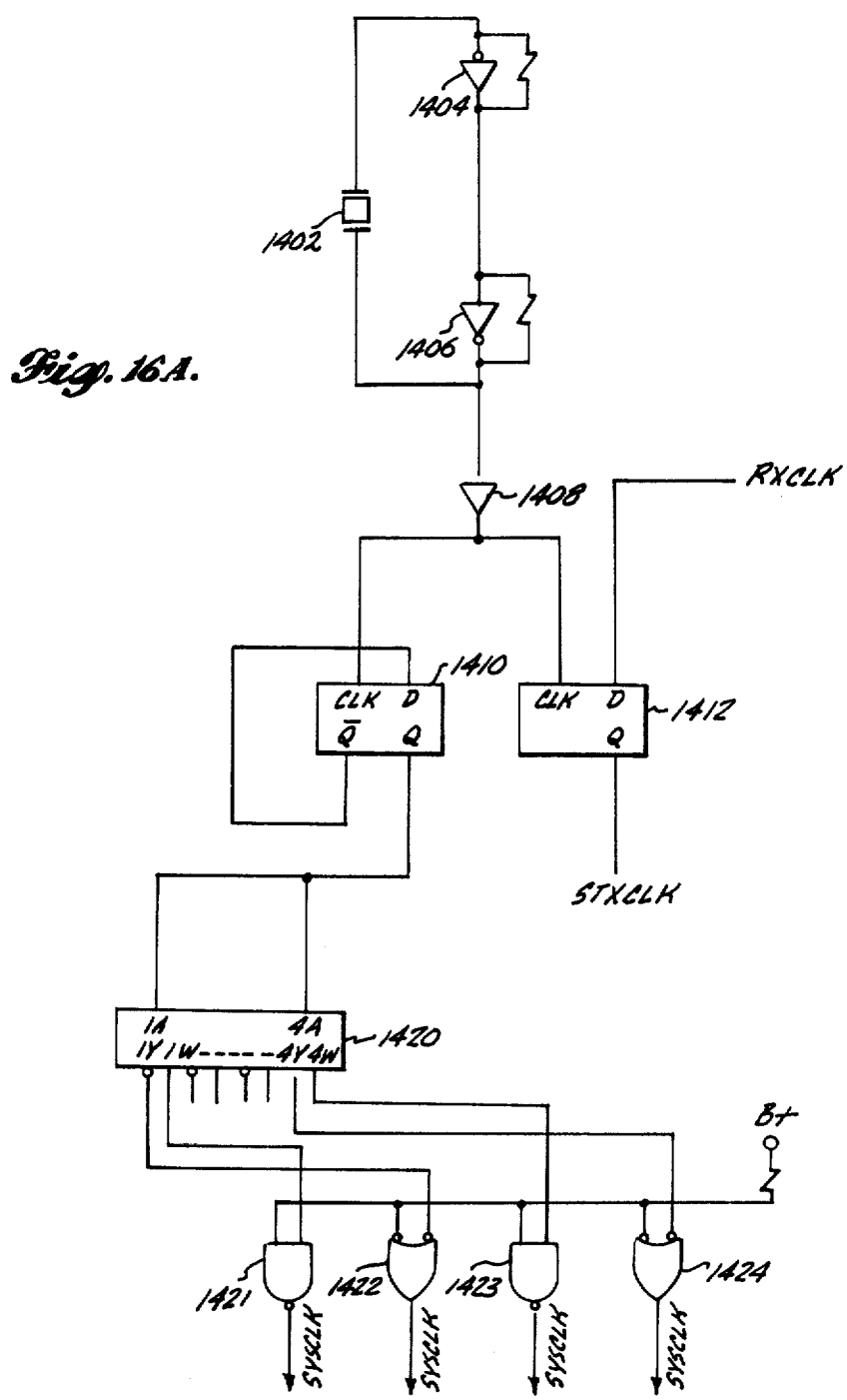
FIGS. 16A-B are detailed schematic diagrams illustrating the preferred construction for the power-up sanity system for the receive data controller processor and receive data communication controller.
Figure 16B:
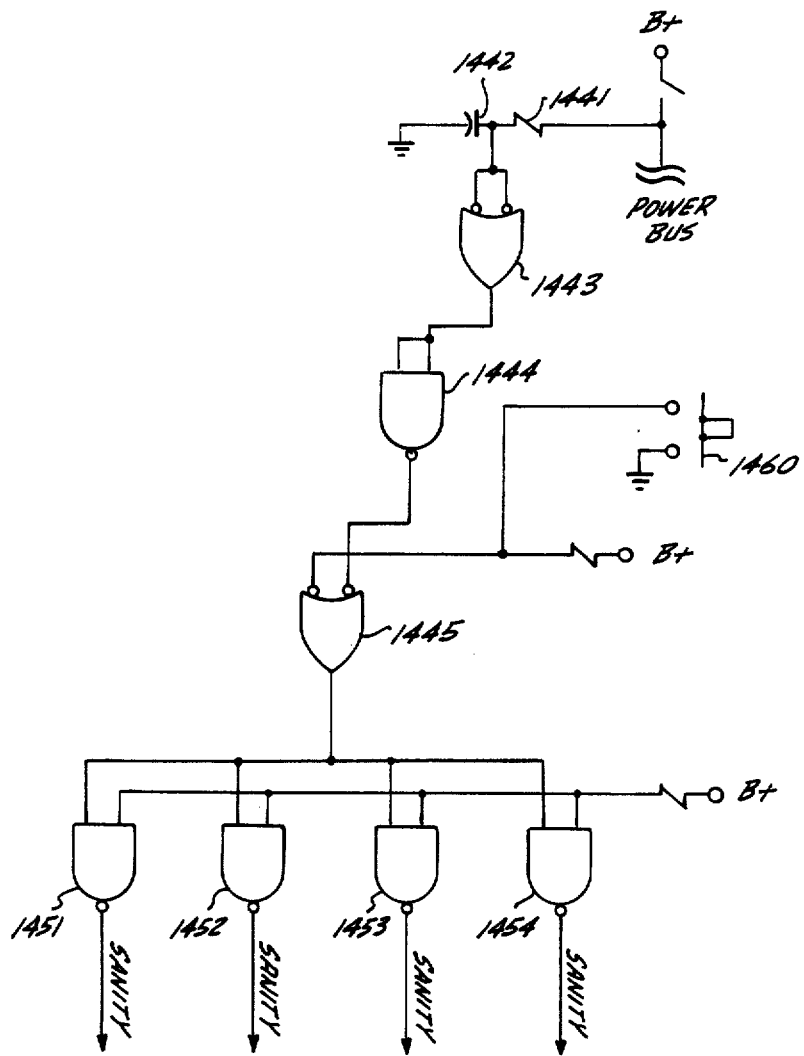

FIGS. 16A and B illustrate the clock and power-on "sanity" circuitry for the RXCC and RXDC/P circuits.

An appropriate clock signal is produced by a crystal 1402 and a pair of inverters 1404, 1406. This signal, as passed through inverter 1408 is applied to the clock inputs of a pair of D flip flops 1410, 1412. Applied at the D input to flip flop 1412 is the RXCLK signal out of the RXCC. The action of the flip flop 1412 is to produce the synchronized clock signal SRXCLK used by the RXCC.

The clock output from the flip flop 1410 is applied to an input of a complimentary driver 1420 (type 74265). The outputs from driver 1420 are applied to the inputs of gates 1421-1424 whose outputs comprise the various clock signals used by the RXCC and RXDC/P.

Power is supplied to the power bus for the RXCC and RXDC/P through a power switch 1440. A timing circuit comprised of resistor 1441, capacitor 1442 and gate 1443 produce an output which is delayed with respect to the time that the power switch 1440 is thrown. This delayed output is coupled through gate 1444 and gate 1445, and is applied as an input to each of four gates 1451-1454. Also applied at an input to gate 1445 is a signal provided by a front panel system reset switch 1460. Thus, the signals produced out of gates 1451-1454 are suitable for indicating the proper "SANITY" condition for use by the RXCC and the RXDC/P.

In summary, a communication interface has been disclosed which is capable of high speed data transfer between remote data processing units using only a minimum of interconnect links.

While a preferred embodiment of the invention has been described in detail, it should be apparent that many modifications and variations thereto are possible, all of which fall within the true spirit and scope of the invention.

The embodiments of the invention in which an exclusive property privilege is claimed are defined as follows:

1. In a data processing system wherein data processing units communicate via a multiple line data channel and a control channel, a communication interface for connection to each data processor such that data and control signals are carried over links between the interfaces associated with each data processing unit, the communication interface comprising:
   a transmitter section including:
   a transmit data controller processor (TXDC/P) having:
      (A) multiple data inputs, each data input adapted to be coupled to one of the data processor output data lines,
      (B) a control input adapted to be coupled to the data processor control line,
      (C) means for producing multiple bit protocol signals, each protocol signal corresponding to one of the data processing unit control line signals,
      (D) an output bus, and
      (E) a controller for:
         (i) responding to data processing control and data signals, and a received TXHRE signal, for predeterminedly loading the protocol signals and data signals to the output bus, and
         (ii) issuing a load transmit signal LDXMIT upon loading the output bus;
   a transmit data communication controller (TXCC) having:
      (A) an input register with multiple inputs coupled to the TXDC/P output bus,
      (B) an output means adapted for coupling a signal to the link between communication interfaces,
      (C) a controller for:
         (i) responding to a LDXMIT signal to load the signal at the TXDC/P output bus into the TXCC input register,
         (ii) serially outputting said TXCC input register signal,
         (iii) coupling said serial signal to the output means, and
         (iv) issuing a TXHRE signal to the TXDC/P; and
   a receiver section including:
   a receive data communication controller (RXCC) having:
      (A) input processing means for predeterminedly processing a signal on the link from another communication interface,
      (B) a RXCC register, and
      (C) a controller for sequentially loading a link processed signal into the RXCC register and issuing a control signal BRCVD in response to so loading the RXCC register;
   a receive data controller processor (RXDC/P) having:
      (A) a register having an input bus coupled to the output of the RXCC register,
      (B) multiple outputs, each output adapted to be coupled to the data processor receive data and control lines, and,
      (C) a controller for:
         (i) responding to a BRCVD signal to parallel load the data in the RXCC register into the RXDC/P register,
         (ii) identifying a protocol signal and issuing an appropriate control signal on the data processing unit input control channel in response thereto, and,
         (iii) outputting the RXDC/P register data signal for transmission to the data processing unit.

2. The communication interface of claim 1 wherein each data processing unit data signal is comprised of M-bits, where M is a predetermined integer, and wherein:
   the TXDC/P controller further includes means for splitting each M-bit data signal into predetermined portions and predeterminedly loading said portions onto the TXDC/P output bus;
   the RXDC/P controller further includes means for predeterminedly combining received M-bit data signal portions from the RXCC register to restore said M-bit data signal for transmission to a data processing unit.

3. The communication interface of claim 2 wherein each data processing unit is capable of producing a DATA READY control signal in association with said M-bit data signal, and wherein:
   the TXDC/P controller further includes means for identifying a received DATA READY control signal and, in response to successive received TXHRE signals, sequentially loading the protocol signal corresponding to the DATA READY signal and the predetermined portions of the M-bit data onto the TXDC/P output bus; and
   the RXDC/P controller further includes means for identifying a received protocol signal corresponding to the DATA READY signal and in response thereto issuing a DATA READY signal to the control channel of the data processing unit.

4. The communication interface of claim 3 wherein each data processing unit is capable of producing an ACK control signal acknowledging receipt of data, and wherein:
   the TXDC/P controller further includes means for identifying a received ACK control signal and loading the protocol signal corresponding to the ACK signal onto the TXDC/P output bus; and
   the RXDC/P controller further includes means for identifying a received protocol signal corresponding to the ACK signal and in response thereto issuing the ACK signal to the control channel of a data processing unit.

5. The communication interface of any one of claims 1 through 4 wherein:
   the TXCC output means comprises an encoder for encoding the serial protocol and data signals prior to transmission over the link between the communication interfaces; and
   the RXCC input processing means comprises a decoder for decoding the encoded serial protocol and data signals.

6. The communication interface of claim 5 wherein:
   the TXCC output means encoder is a Manchester encoder, and
   the RXCC decoder is a Manchester decoder.

7. The communication interface of any one of claims 1 through 4 wherein the link between communication interfaces is comprised of two fiber optic links, and wherein:
   the TXCC output means further comprises an electro-optical transducer for converting the serial protocol and data signals to a form suitable for transmission over one of the fiber optic links; and the RXCC input processing means further comprises an electro-optical transducer for converting received optical signals from the other fiber optic link into corresponding electrical signals.

8. In a data processing system wherein data processors exchange multiple bit, parallel data words over a multiple line data channel and wherein each processor produces each data word in association with a DATA READY control signal on a control channel, each processor acknowledging receipt of data by the transmission of an ACK signal on the control channel, a method for processing input and output signals at each data processor, the method comprising the steps of:

(A) providing a transmit data controller processor (TXDC/P), the TXDC/P performing the steps of:
  (i) providing a TXDC/P output bus,
  (ii) monitoring the data and control channels,
  (iii) identifying the condition of a DATA READY signal on the control channel and in response thereto:
    (a) generating a corresponding multiple bit protocol word, and
    (b) sequentially loading onto the TXDC/P output bus the protocol word and predetermined portions of the data word supplied on the data channel, in response to successive received TXHRE signals;
  (iv) identifying the condition of an ACK signal on the control channel and in response thereto:
    (a) generating a corresponding multiple bit protocol signal, and
    (b) loading the protocol signal onto the TXDC/P output bus;

(B) providing a transmit data communication controller (TXCC/P), the TXCC/P performing the steps of:
  (i) providing an output processing means for predeterminedly processing a serial signal and coupling said processed serial signal to an output line, said output line being coupled to another processor,
  (ii) parallel-to-serial converting each signal on the TXDC/P output bus,
  (iii) coupling each such serial signal to said output processing means, and
  (iv) issuing a TXHRE signal to the TXDC/P;

(C) providing a receive data communication controller (RXCC) performing the steps of:
  (i) receiving and predeterminedly processing a serial signal transmitted by the TXCC of another data processor,
  (ii) serial-to-parallel converting said processed serial signal into the protocol and data signals; and (D) providing a receive data controller processor (RXDC/P) for performing the steps of:
  (i) receiving the serial-to-parallel converted protocol and data signals from the TXCC,
  (ii) identifying a protocol signal corresponding to the DATA READY signal and, in response thereto:
    (a) issuing a DATA READY signal to the control channel of an associated data processor, and,
    (b) combining successive portions of a data word to restore said word and apply said restored word to the data channel input of an associated data processor, and
  (iii) identifying a protocol signal corresponding to an ACK and in response thereto issuing an ACK signal to the control channel of an associated data processor.

9. The method of claim 8 wherein:
Step (B) (i) comprises the step of: encoding the serial protocol and data signals, and
Step (C) (i) comprises the step of: decoding a received serial signal from the TXCC of another data processor.

10. The method of claim 8 wherein:
Step (B) (i) comprises the step of: Manchester encoding the serial protocol and data signals, and
Step (C) (i) comprises the step of: Manchester decoding a received serial signal from the TXCC of another data processor.

11. The method of any one of claims 8 through 10 wherein:
Step (B) (i) comprises the step of electro-optically transducing a processed serial protocol and data signal such that said processed signal is suitable for transmission over an optical fiber link; and
Step (C) (i) comprises the step of transducing a received signal from another data processor over the optical fiber link into a corresponding electrical signal.

* * * * *